United States Patent
Field et al.

(10) Patent No.: US 7,051,399 B2
(45) Date of Patent: May 30, 2006

(54) CLEANER CARTRIDGE

(75) Inventors: Bruce F. Field, Golden Valley, MN (US); Daniel L. Joynt, Wyoming, MN (US); Jeffrey A. Johnson, St. Paul, MN (US); Joseph K. Krueger, Hopkins, MN (US); Bryan L. Christensen, Dayton, MN (US)

(73) Assignee: Tennant Company, Minneapolis, MN (US)

( * ) Notice: Subject to any disclaimer, the term of this patent is extended or adjusted under 35 U.S.C. 154(b) by 320 days.

(21) Appl. No.: 10/152,549

(22) Filed: May 21, 2002

(65) Prior Publication Data

US 2003/0019071 A1    Jan. 30, 2003

Related U.S. Application Data

(63) Continuation-in-part of application No. 10/026,411, filed on Dec. 21, 2001.

(60) Provisional application No. 60/308,773, filed on Jul. 30, 2001.

(51) Int. Cl.
*E01H 1/08* (2006.01)
*A47L 11/30* (2006.01)

(52) U.S. Cl. ........................................................ 15/320

(58) Field of Classification Search ................ 15/320, 15/340.1, 340.2, 340.3, 340.4; 222/95, 105, 222/107, 136, 145.5–145.7, 630
See application file for complete search history.

(56) References Cited

U.S. PATENT DOCUMENTS

| | | | |
|---|---|---|---|
| 2,563,151 A | 8/1951 | Bjorksten | 134/111 |
| 2,731,659 A | 1/1956 | Coplen | 15/320 |
| 2,993,494 A | 7/1961 | Svensson | 134/169 |
| 3,037,887 A | 6/1962 | Brenner et al. | 134/22 |
| 3,078,190 A | 2/1963 | Blaser et al. | 134/10 |
| 3,162,427 A | 12/1964 | Knudson et al. | 259/4 |
| 3,212,762 A | 10/1965 | Carroll et al. | 261/124 |
| 3,231,134 A | 1/1966 | Webster | 222/1 |
| 3,392,418 A | 7/1968 | Schowalter | 15/320 |
| 3,436,262 A | 4/1969 | Crowe et al. | 134/10 |
| 3,453,678 A | 7/1969 | Gehman et al. | 15/50 |
| 3,456,279 A | 7/1969 | Koland et al. | 15/320 |
| 3,460,717 A * | 8/1969 | Thomas | 222/129.1 |
| 3,490,948 A | 1/1970 | Farison | 134/36 |
| 3,535,162 A | 10/1970 | Bray et al. | 134/42 |
| 3,549,420 A | 12/1970 | Cunningham | 134/22 |
| 3,655,096 A | 4/1972 | Easter | 222/82 |
| 3,676,889 A | 7/1972 | Edlin | 15/320 |
| 3,761,987 A | 10/1973 | Nayfa et al. | 15/50 |
| 3,774,262 A | 11/1973 | Anthony et al. | 15/322 |
| 3,789,449 A | 2/1974 | MacFarland et al. | 15/4 |

(Continued)

FOREIGN PATENT DOCUMENTS

DE    44 13 783 A1    3/1995

(Continued)

OTHER PUBLICATIONS

Discover Magazine, Jun. 2002, "Does the Universe Exist if We Don't Observe It?", including cover, Table of Contents, and pp. 26 and 27.

(Continued)

*Primary Examiner*—Terrence R. Till
(74) *Attorney, Agent, or Firm*—Westman, Champlin & Kelly

(57) ABSTRACT

A cleaner cartridge includes a container having an interior cavity, in which cleaning agent can be stored. A first end of conduit is fluidically coupled to the interior cavity. A second end of the conduit is connectable to a chemical dispenser.

57 Claims, 15 Drawing Sheets

U.S. PATENT DOCUMENTS

| | | | |
|---|---|---|---|
| 3,823,727 A | 7/1974 | Fry | 137/88 |
| 3,931,662 A | 1/1976 | Nayfa et al. | 15/320 |
| 3,938,212 A | 2/1976 | Krier et al. | 15/50 |
| 3,940,826 A | 3/1976 | Phillips et al. | 15/320 |
| 3,942,218 A | 3/1976 | Krier et al. | 15/340 |
| 3,974,541 A * | 8/1976 | Silvis et al. | 15/320 |
| 3,979,789 A | 9/1976 | Peabody et al. | 15/349 |
| 4,000,536 A | 1/1977 | Nayfa et al. | 15/50 |
| 4,014,808 A | 3/1977 | Herpers, Jr. et al. | 252/135 |
| 4,032,307 A | 6/1977 | Sommerfeld | 55/96 |
| 4,037,289 A | 7/1977 | Dojan | 15/320 |
| D245,994 S | 10/1977 | Olson | D23/162 |
| 4,061,001 A | 12/1977 | Von der Eltz et al. | 68/200 |
| 4,096,084 A | 6/1978 | Thomsen et al. | 252/173 |
| 4,099,285 A | 7/1978 | Christensen et al. | 15/83 |
| 4,107,075 A | 8/1978 | Kramer | 252/359 |
| 4,133,773 A | 1/1979 | Simmons | 252/359 |
| 4,138,756 A | 2/1979 | Krier et al. | 15/83 |
| RE29,957 E | 4/1979 | Kasper | 15/83 |
| 4,167,798 A | 9/1979 | Kltigl et al. | 15/320 |
| 4,167,799 A | 9/1979 | Webb | 15/320 |
| 4,173,056 A | 11/1979 | Geyer | 15/320 |
| 4,191,590 A | 3/1980 | Sundheim | 134/21 |
| 4,194,263 A | 3/1980 | Herpers et al. | 15/353 |
| 4,206,530 A | 6/1980 | Kroll et al. | 15/340 |
| 4,210,978 A * | 7/1980 | Johnson et al. | 15/320 |
| D257,845 S | 1/1981 | Peabody et al. | D15/50 |
| 4,258,451 A | 3/1981 | Sommerfeld | 15/352 |
| 4,262,382 A | 4/1981 | Brown et al. | 15/49 |
| 4,295,244 A | 10/1981 | Herpers et al. | 15/320 |
| 4,310,944 A | 1/1982 | Kroll et al. | 15/346 |
| 4,320,556 A | 3/1982 | Kimzey et al. | 15/347 |
| 4,334,335 A | 6/1982 | Brown et al. | 15/319 |
| 4,345,353 A | 8/1982 | Sommerfeld | 15/349 |
| 4,346,494 A | 8/1982 | Peabody et al. | 15/179 |
| 4,348,783 A | 9/1982 | Swanson et al. | 15/320 |
| 4,355,435 A | 10/1982 | Kimzey et al. | 15/347 |
| 4,365,189 A | 12/1982 | Hawkins et al. | 318/284 |
| 4,369,544 A | 1/1983 | Parisi | 15/320 |
| D267,824 S | 2/1983 | Mannelly | D32/16 |
| 4,373,227 A | 2/1983 | Kimzey et al. | 15/347 |
| 4,377,017 A | 3/1983 | Herpers et al. | 15/320 |
| 4,378,855 A | 4/1983 | Haub et al. | 180/65 |
| 4,393,538 A | 7/1983 | Olson | 15/320 |
| 4,419,141 A | 12/1983 | Kunkel | 134/22.12 |
| 4,429,432 A | 2/1984 | Copeland et al. | 15/320 |
| D273,620 S | 4/1984 | Kimzey et al. | D32/16 |
| D273,621 S | 4/1984 | Haub et al. | D32/16 |
| D273,622 S | 4/1984 | Brown et al. | D32/16 |
| 4,457,036 A | 7/1984 | Carlson et al. | 15/49 |
| 4,511,486 A | 4/1985 | Shah | 252/90 |
| 4,557,739 A | 12/1985 | Fortman et al. | 55/320 |
| 4,570,856 A | 2/1986 | Groth et al. | 239/310 |
| 4,571,771 A | 2/1986 | Worwa | 15/319 |
| 4,580,313 A | 4/1986 | Blehert | 15/349 |
| 4,586,208 A | 5/1986 | Trevarthen | 8/158 |
| 4,595,420 A | 6/1986 | Williams, III et al. | 134/6 |
| 4,608,086 A | 8/1986 | Dodge | 106/12 |
| 4,615,070 A | 10/1986 | Frederick et al. | 15/339 |
| 4,624,026 A | 11/1986 | Olson et al. | 15/340 |
| 4,634,403 A | 1/1987 | Peabody et al. | 474/1 |
| 4,667,364 A | 5/1987 | Meili | 15/320 |
| 4,675,935 A | 6/1987 | Kasper et al. | 15/319 |
| 4,676,287 A | 6/1987 | Fitzwater | 141/285 |
| 4,676,926 A | 6/1987 | Kappler | 252/307 |
| 4,679,271 A | 7/1987 | Field et al. | 15/49 |
| 4,709,771 A | 12/1987 | Basham et al. | 180/6.5 |
| 4,729,141 A | 3/1988 | Berg et al. | 15/49 |
| 4,757,566 A | 7/1988 | Field et al. | 15/49 |
| 4,768,311 A | 9/1988 | Olson | 51/174 |
| 4,780,243 A | 10/1988 | Edgley et al. | 252/307 |
| 4,805,256 A | 2/1989 | Mason et al. | 15/320 |
| 4,805,258 A | 2/1989 | Sitarski et al. | 15/385 |
| 4,817,233 A | 4/1989 | Waldhauser | 15/320 |
| 4,819,676 A | 4/1989 | Blehert et al. | 134/21 |
| 4,822,431 A | 4/1989 | Bricher et al. | 134/28 |
| 4,838,457 A * | 6/1989 | Swahl et al. | 222/48 |
| 4,849,027 A | 7/1989 | Simmons | 134/22.18 |
| 4,866,804 A | 9/1989 | Masbruch et al. | 15/49 |
| 4,881,288 A | 11/1989 | May et al. | 15/98 |
| 4,903,718 A * | 2/1990 | Sullivan | 134/184 |
| 4,913,316 A * | 4/1990 | Richter | 222/1 |
| 4,967,064 A | 10/1990 | Field et al. | 250/203.2 |
| 4,974,618 A * | 12/1990 | Nysted | 134/21 |
| 4,986,378 A | 1/1991 | Kasper | 180/6.48 |
| 4,996,468 A | 2/1991 | Field et al. | 318/587 |
| 5,013,333 A | 5/1991 | Beaufoy et al. | 55/21 |
| 5,016,310 A | 5/1991 | Geyer et al. | 15/49.1 |
| 5,031,837 A | 7/1991 | Hanish | 239/267 |
| 5,044,043 A | 9/1991 | Basham et al. | 15/319 |
| 5,045,118 A | 9/1991 | Mason et al. | 134/21 |
| 5,060,342 A | 10/1991 | Brazier | 15/322 |
| 5,064,010 A | 11/1991 | Mashbruch et al. | 180/6.5 |
| 5,088,149 A | 2/1992 | Berg et al. | 15/322 |
| 5,093,955 A | 3/1992 | Blehert et al. | 15/320 |
| RE33,926 E | 5/1992 | Waldhauser | 15/320 |
| 5,116,425 A | 5/1992 | Ruef | 134/17 |
| 5,133,107 A | 7/1992 | MacDonald | 15/50.3 |
| 5,207,642 A * | 5/1993 | Orkin et al. | 604/65 |
| 5,212,848 A | 5/1993 | Geyer | 15/401 |
| 5,213,120 A | 5/1993 | Dickson | 134/102.1 |
| 5,231,725 A | 8/1993 | Hennessey et al. | 15/83 |
| 5,244,003 A | 9/1993 | Boomgaarden | 137/1 |
| 5,254,146 A | 10/1993 | Beaufoy | 55/320 |
| 5,276,933 A | 1/1994 | Hennessey et al. | 15/83 |
| 5,295,277 A | 3/1994 | Koenigs et al. | 15/83 |
| 5,303,448 A | 4/1994 | Hennessey et al. | 15/340.3 |
| 5,319,828 A | 6/1994 | Waldhauser et al. | 15/320 |
| 5,383,605 A | 1/1995 | Teague | 239/526 |
| RE35,033 E | 9/1995 | Waldhauser | 15/320 |
| 5,455,985 A | 10/1995 | Hamline et al. | 15/401 |
| 5,462,607 A | 10/1995 | Mestetsky et al. | 134/22.12 |
| 5,483,718 A | 1/1996 | Blehert et al. | 15/50.3 |
| 5,509,972 A | 4/1996 | Akazawa et al. | 134/26 |
| 5,515,568 A | 5/1996 | Larson et al. | 15/50.3 |
| 5,526,547 A * | 6/1996 | Williams et al. | 15/320 |
| 5,566,422 A | 10/1996 | Geyer | 15/320 |
| 5,593,091 A | 1/1997 | Harris | 239/127 |
| 5,647,093 A | 7/1997 | Engel et al. | 15/352 |
| 5,649,643 A | 7/1997 | Ridgeway | 222/105 |
| 5,659,921 A | 8/1997 | Narayan | 15/349 |
| 5,711,775 A | 1/1998 | Field et al. | 55/273 |
| 5,735,017 A * | 4/1998 | Barnes et al. | 15/321 |
| 5,738,248 A * | 4/1998 | Green | 222/129.2 |
| 5,813,086 A | 9/1998 | Ueno et al. | 15/320 |
| 5,816,298 A * | 10/1998 | Stricklin et al. | 141/346 |
| 5,829,094 A | 11/1998 | Field et al. | 15/352 |
| 5,836,045 A * | 11/1998 | Anthony et al. | 15/320 |
| 5,853,814 A | 12/1998 | Murphy | 427/434.6 |
| 5,871,152 A | 2/1999 | Saney | 239/8 |
| 5,884,353 A | 3/1999 | Berg et al. | 15/83 |
| 5,893,189 A | 4/1999 | D'Costa | 15/83 |
| 5,901,407 A | 5/1999 | Boomgaarden | 15/320 |
| 5,940,928 A | 8/1999 | Erko | 15/319 |
| 5,940,929 A | 8/1999 | Berg | 15/334 |
| 5,943,724 A | 8/1999 | Erko et al. | 15/49.1 |
| 5,943,730 A | 8/1999 | Boomgaarden | 15/320 |
| 5,967,747 A | 10/1999 | Burke et al. | 415/206 |
| 5,983,447 A | 11/1999 | Boomgaarden | 15/354 |
| 5,991,953 A | 11/1999 | Durenberger et al. | 15/83 |
| 5,996,173 A | 12/1999 | Engel et al. | 15/352 |
| 5,996,174 A | 12/1999 | Boomgaarden et al. | 15/354 |

| | | | |
|---|---|---|---|
| 6,003,186 A | 12/1999 | Larson | 15/82 |
| 6,017,163 A | 1/2000 | Keppers et al. | 401/48 |
| 6,018,844 A | 2/2000 | Basham et al. | 15/349 |
| 6,035,479 A | 3/2000 | Basham et al. | 15/83 |
| 6,073,295 A | 6/2000 | Durenberger et al. | 15/83 |
| 6,090,217 A | 7/2000 | Kittle | 134/11 |
| 6,092,261 A | 7/2000 | Boomgaarden | 15/323 |
| 6,117,200 A | 9/2000 | Berg et al. | 55/287 |
| 6,125,495 A | 10/2000 | Berg et al. | 15/183 |
| 6,131,766 A * | 10/2000 | King et al. | 222/1 |
| 6,192,542 B1 | 2/2001 | Frederick et al. | 15/84 |
| 6,202,243 B1 | 3/2001 | Beaufoy et al. | 15/49.1 |
| 6,209,756 B1 | 4/2001 | Van Der Heijden | 222/105 |
| 6,249,926 B1 | 6/2001 | Wulff | 15/50.1 |
| 6,276,613 B1 | 8/2001 | Kramer | 239/304 |
| 6,283,221 B1 * | 9/2001 | Hurray et al. | 169/30 |
| 6,286,169 B1 | 9/2001 | D'Costa et al. | 15/52.1 |
| 6,389,641 B1 | 5/2002 | Boomgaarden et al. | 15/340.1 |
| 6,398,829 B1 | 6/2002 | Shinler et al. | 55/317 |
| 6,418,586 B1 | 7/2002 | Fulghum | 15/320 |
| 6,421,870 B1 | 7/2002 | Basham et al. | 15/83 |
| 6,425,958 B1 | 7/2002 | Giddings et al. | 134/21 |
| 6,428,590 B1 | 8/2002 | Lehman et al. | 55/334 |
| 6,449,793 B1 | 9/2002 | D'Costa et al. | 15/52.1 |
| 6,505,379 B1 | 1/2003 | Keller | 15/339 |
| 6,507,968 B1 | 1/2003 | Hansen | 15/49.1 |
| 6,523,992 B1 * | 2/2003 | Bublewitz et al. | 366/172.1 |
| 6,530,102 B1 | 3/2003 | Pierce et al. | 15/52.1 |
| 6,543,580 B1 * | 4/2003 | Gathmann et al. | 184/7.4 |
| 6,585,827 B1 | 7/2003 | Field et al. | 134/6 |
| 6,602,018 B1 | 8/2003 | Feeny et al. | 403/227 |
| 6,614,195 B1 | 9/2003 | Bushey et al. | 318/135 |
| 6,618,888 B1 | 9/2003 | Joynt et al. | 15/49.1 |
| 6,651,286 B1 | 11/2003 | Pierce | 15/98 |
| 6,662,402 B1 | 12/2003 | Giddings et al. | 15/320 |
| 6,662,600 B1 | 12/2003 | Field et al. | 68/17 |
| D485,175 S | 1/2004 | Field et al. | D9/432 |
| 6,671,925 B1 | 1/2004 | Field et al. | 15/320 |
| 6,705,332 B1 | 3/2004 | Field et al. | 134/102.1 |
| 6,735,811 B1 | 5/2004 | Field et al. | 15/320 |
| 6,735,812 B1 | 5/2004 | Hekman et al. | 15/320 |
| 6,742,219 B1 | 6/2004 | Lenzmeier et al. | 15/345 |
| 6,802,098 B1 | 10/2004 | Geyer et al. | 15/52.1 |
| 6,836,919 B1 | 1/2005 | Shinler | 15/78 |
| 6,877,180 B1 | 4/2005 | Wilmo et al. | 15/83 |
| 2001/0022010 A1 * | 9/2001 | Kasper | 15/320 |
| 2002/0096258 A1 | 7/2002 | Savas et al. | 156/345.48 |
| 2003/0029885 A1 * | 2/2003 | Kawolics et al. | 222/105 |
| 2004/0040102 A1 | 3/2004 | Field et al. | 15/50.1 |
| 2004/0187895 A1 | 9/2004 | Field et al. | 134/26 |
| 2004/0221407 A1 | 11/2004 | Field et al. | 15/50.1 |

FOREIGN PATENT DOCUMENTS

| | | |
|---|---|---|
| EP | 0 744 148 A2 | 11/1996 |
| EP | 1 044 645 A2 | 10/2000 |
| JP | 11216092 | 8/1999 |
| WO | WO 95/09557 | 4/1995 |
| WO | WO 00/35333 | 6/2000 |
| WO | WO 02/05047 | 1/2002 |
| WO | WO 02/06435 | 1/2002 |

OTHER PUBLICATIONS

International Search Report from International Application No. PCT/US 02/23769 filed Jul. 26, 2002 (date of report Dec. 2, 2002).

International Search Report from International Application No. PCT/US 02/19367, filed Jun. 17, 2002, dated Dec. 12, 2002.

International Search Report from the European Patent Office for International Application No. PCT/US 02/23823, dated Mar. 13, 2003.

International Preliminary Examination Report for International Application No. PCT/US02/23758, filed Jul. 30, 2001, with a mailing date of Sep. 27, 2003.

Office Communication for U.S. Appl. No. 10/751,838, filed Jan. 5, 2004. Date of mailing: Nov. 24, 2004.

Office Communication from U.S. Appl. No. 10/751,838, filed Jan. 5, 2004, date of mailing May 24, 2005.

U.S. Appl. No. 11/125,764, filed May 10, 2005, Field et al.

U.S. Appl. No. 11/211,987, entitled "Cleaning Liquid Dispensing in a Mobile Hard Surface Cleaner," filed Aug. 25, 2005.

An Official Office Action from the SIPO in China in counterpart foreign application No. 02817371.6 based on US02/23758, filed Jul. 26, 2002. Date of Office Action Oct. 14, 2005.

International Search Report and Written Opinion for International Applicatioin No. PCT/US04/28616, filed Sep. 2, 2004; date of Mailing Jan. 12, 2005.

Notification of Transmittal of International Search Report and Written Opinion for International Application No. PCT/US04/27764 filed Aug. 26, 2004; date of mailing Feb. 10, 2005.

Official Search Report of the European Patent Office in counterpart foreign application No. 02750322.6 filed Jul. 26, 2002; date of mailing Nov. 30, 2005.

* cited by examiner

CLEANER CARTRIDGE

The present application is a Continuation-in-Part of U.S. application Ser. No. 10/026,411, filed Dec. 21, 2001 and entitled "APPARATUS AND METHOD OF USE FOR CLEANING A HARD FLOOR SURFACE UTILIZING AN AERATED CLEANING LIQUID," which in turn claims priority to U.S. Provisional Application Ser. No. 60/308,773, filed Jul. 30, 2001 and entitled "APPARATUS AND METHOD OF USE FOR CLEANING A HARD FLOOR SURFACE UTILIZING AN AERATED CLEANING LIQUID". Reference is also hereby made to the following related co-pending applications: U.S. application Ser. No. 10/143,582, filed May 9, 2002, and entitled "CLEANING LIQUID DISPENSING SYSTEM FOR A HARD FLOOR SURFACE CLEANER"; and U.S. application Ser. No. 10/152,537, filed May 21, 2002 and entitled "CHEMICAL DISPENSER FOR A HARD FLOOR SURFACE CLEANER." All of the above-referenced applications are incorporated herein by reference in their entirety.

FIELD OF THE INVENTION

The present invention relates generally to hard floor surface cleaners and, more particularly, to a cleaner cartridge for use in a hard floor surface cleaner to contain a supply of cleaning agent that is used in a cleaning liquid dispensing system.

BACKGROUND OF THE INVENTION

Hard floor surface cleaners are widely used to clean the floors of industrial and commercial buildings. They range in size from a small model that is controlled by an operator walking behind the cleaner and can clean a path ranging from 15 inches to 36 inches wide, to a large model that is controlled by an operator riding on the machine and can clean a path as wide as 5 feet. These hard floor surface cleaners include motorized drive wheels, a solution tank to hold cleaning solution and a recovery tank to hold soiled cleaning solution recovered from the floor being scrubbed. The cleaning solution, which typically includes a cleaning agent mixed with water, is applied to the hard floor surface adjacent a scrub head. The scrub head generally contains one or more motorized scrubbing brushes attached either in front of, under, or behind the vehicle. These scrubbing brushes typically rotate to provide the desired scrubbing action. The soiled cleaning solution is then recovered using a solution recovery system, which returns the soiled cleaning solution to the recovery tank.

The cleaning solution is typically gravity fed to the scrub head at a rate that varies in response to the volume of cleaning solution contained in the solution tank. As the volume of cleaning solution contained in the solution tank decreases, the rate at which the cleaning solution is fed to the scrub head decreases. For example, a typical hard floor surface cleaner having a 32 inch wide scrubbing swath applies the cleaning solution to the hard floor surface at a rate that varies from between approximately 1.0 gallons per minute (GPM) when the solution tank is full to a rate of 0.5 GPM when the tank contains a low volume of cleaning solution.

One problem with prior art hard floor surface cleaners has been their limited operational runtime. This is primarily due to their limited solution tank volume and the high cleaning solution flow rates. A typical hard floor surface cleaner having a 32 inch cleaning swatch typically has an operational runtime based on solution capacity of approximately 30–40 minutes, for example.

One possible solution to the short run runtime for these cleaners is to increase the size of the solution and recovery tanks. Unfortunately, such an increase in cleaning solution capacity typically necessitates modifications to the frame and other components of the hard floor surface cleaner, which results in additional weight and higher energy requirements for the device. For most applications, these modifications are impractical.

The high volume flow rate of cleaning solution has been generally desired to provide complete wetting of the floor being cleaned. Unfortunately, the lack of control of the volume flow rate of the cleaning solution results in an excessive amount of cleaning solution being distributed to the floor, when, for example, the solution tank is full. The high volume flow rate of the cleaning solution of prior art hard floor surface cleaners also results in extended downtime. The long downtime periods are generally due to the numerous disposals of soiled cleaning solution. Additional downtime results from having to refill the solution tank with cleaning solution, which involves manually filling the solution tank with water and mixing in the cleaning agent. Additionally, where the cleaning process removes harmful or hazardous chemicals, the disposal of the soiled cleaning solution may require special handling and/or additional costs to ensure that it is disposed of properly. As a result, the large volumes of cleaning solution that are used by prior art hard floor surface cleaners reduce the efficiency at which a cleaning job can be performed.

Consequently, prior art hard floor surface cleaners suffer from several deficiencies that lead to inefficient floor cleaning operations. Most of these deficiencies stem from the poor cleaning solution flow rate control and the high volume flow rate of the cleaning solution that is applied to the hard floor surface. Additional problems can result from having to manually prepare the cleaning solution, such as mixing too much or too little cleaning agent in the water.

SUMMARY OF THE INVENTION

The present invention is directed to a cleaner cartridge for use in a hard floor surface cleaner. The cleaner cartridge can be used to contain a supply of cleaning agent that dispensed by a chemical dispenser of a cleaning liquid dispensing system to automate the mixing of a primary cleaning liquid component, such as water, with the cleaning agent to form cleaning liquid that is applied to the hard floor surface. This allows for more efficient use of the cleaning agent and primary cleaning liquid component, longer operational runtime and shorter downtime. The cleaner cartridge includes a container having an interior cavity, in which the cleaning agent can be stored. A first end of conduit is fluidically coupled to the interior cavity. A second end of the conduit is connectable to a chemical dispenser.

Other features and benefits that characterize embodiments of the present invention will be apparent upon reading the following detailed description and the review of the associated drawings.

DETAILED DESCRIPTION OF THE PREFERRED EMBODIMENTS

Figure 1:
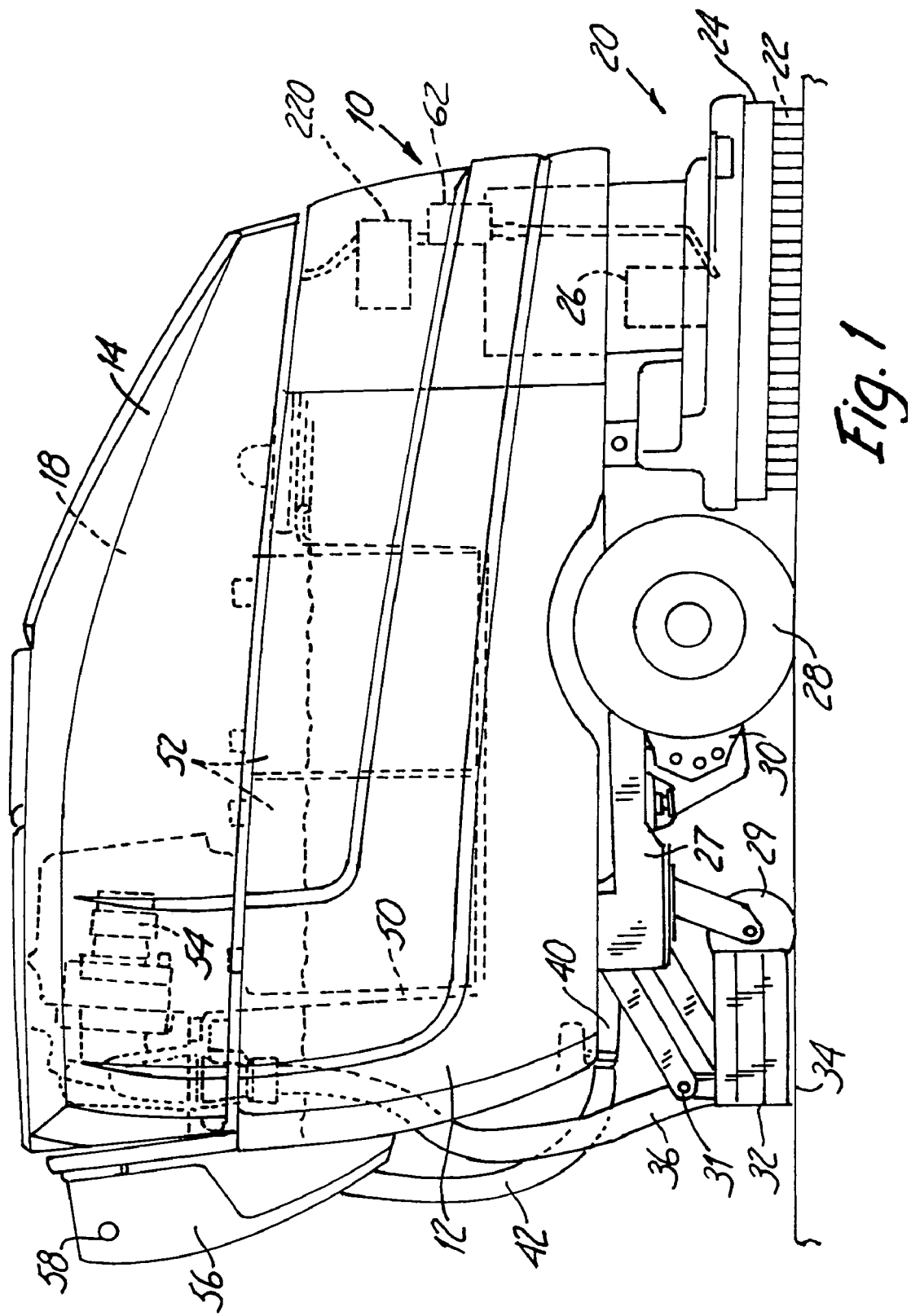
FIGS. 1 and 2 are simplified side elevation views of hard floor surface cleaners in accordance with various embodiments of the present invention.

FIG. 1 illustrates a hard floor surface cleaner 10 in which embodiments of the present invention can be used. The illustrated cleaner 10 is a walk-behind cleaner used to clean hard floor surfaces, such as concrete, tile, vinyl, terrazzo, etc. Alternatively, cleaner 10 can be a ride-on or towed-behind cleaner performing a scrubbing operation as described herein. Cleaner 10 may include electrical motors powered through an on-board power source, such as batteries, or through an electrical cord. Alternatively, an internal combustion engine system could be used either alone, or in combination with, the electric motors. Cleaner 10 generally includes a recovery tank 12, and a lid 14. Lid 14 is attached along one side of the recovery tank 12 by hinges (not shown) so that lid 14 can be pivoted up to provide access to the interior of tank 12. Cleaner 10 also includes a tank 18 for containing cleaning liquid or a primary cleaning liquid component that is applied to the hard floor surface during cleaning operations.

A scrub head 20 includes a scrubbing member 22, shrouds 24, and a scrubbing member drive 26. Scrubbing member 22 may be one or more brushes, such as bristle brushes, pad scrubbers, or other hard floor surface scrubbing elements. Drive 26 includes one or more electric motors to rotate the scrubbing member 22. Scrubbing member 22 may be a disc-type scrub brush rotating about a generally vertical axis of rotation relative to the hard floor surface. Alternatively, scrubbing member 22 may be a cylindrical-type scrub brush rotating about a generally horizontal axis of rotation relative to the hard floor surface. Drive 26 may also oscillate scrubbing member 22. Scrub head 20 is attached to cleaner 10 such that scrub head 20 can be moved between a lowered cleaning position and a raised travelling position.

A machine frame 27 supports recovery tank 12 on wheels 28 and castors 29. Details of the frame are shown and described in U.S. Pat. No. 5,611,105, the disclosure of which is incorporated herein by reference. Wheels 28 are preferably driven by a motor and transaxle assembly shown schematically at 30. The rear of the frame carries a linkage 31 to which a fluid recovery device 32 is attached. In the embodiment of FIG. 1, the fluid recovery device 32 includes a vacuum squeegee 34 and vacuum communication with an inlet chamber in recovery tank 12 through a hose 36. The bottom of the inlet chamber is provided with a drain 40 with a drain hose 42 connected to it.

Figure 2:
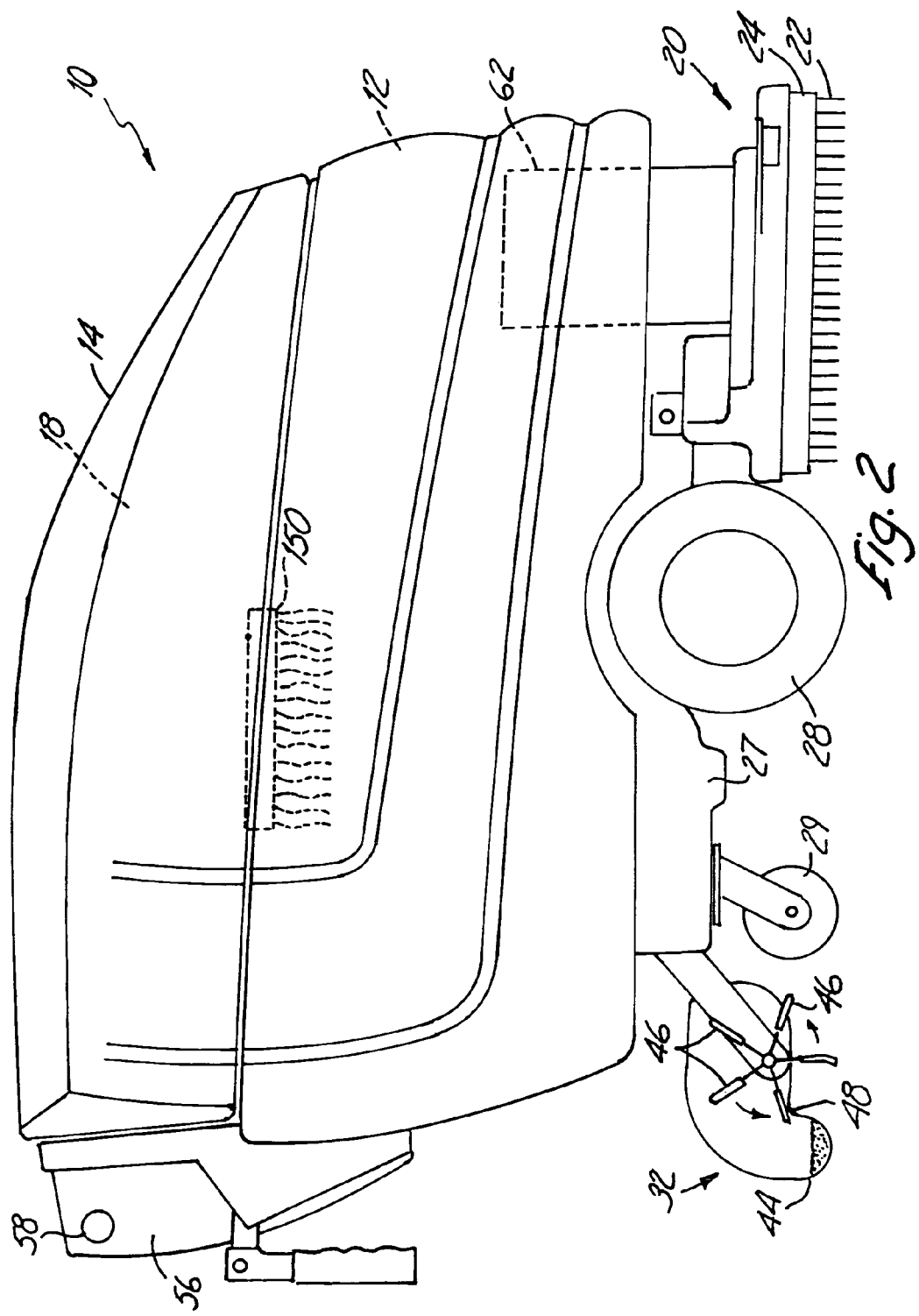

FIG. 2 illustrates hard floor surface cleaner 10 utilizing an alternative soiled solution recovery device 32. In accordance with this embodiment, the soiled solution recovery device 32 includes a non-vacuumized mechanical device for lifting the soiled solution away from the floor surface and conveying the soiled solution toward a collection tank or receptacle 44. The non-vacuumized mechanical device includes a plurality of wiping medium such as pliable material elements 46 which are rotated into contact with the floor surface to engage and lift the soiled solution from the floor surface. The pliable material elements 46 may be of an absorbent material. The pliable material elements 46 convey the solution to the collection receptacle 44. Solution captured on the pliable elements 46 may be removed via a mechanical action, such as through a shearing device or a squeezing device. In the embodiment of FIG. 2, the mechanical action used to remove soiled solution from the pliable material elements 46 is a scraper bar 48 which engages the pliable material elements 46 to release the soiled solution. Alternative mechanical devices, structures, or systems may be used to convey the soiled solution from the floor surface toward a collection receptacle.

Cleaner 10 can include a battery compartment 50 in which batteries 52 reside as shown in FIG. 1. Batteries 52 provide power to drive motors 26, vacuum fan 54, and other electrical components of cleaner 10. Vacuum fan 54 is mounted in the lid 14. A control unit 56 mounted on the rear of the body of cleaner 10 includes steering control handles 58 and operating controls and gages for cleaner 10. Additional aspects of automatic hard floor surface cleaners are disclosed in U.S. Pat. Nos. 5,483,718; 5,515,568; and 5,566,422, each of which are incorporated herein by reference.

Figure 3:
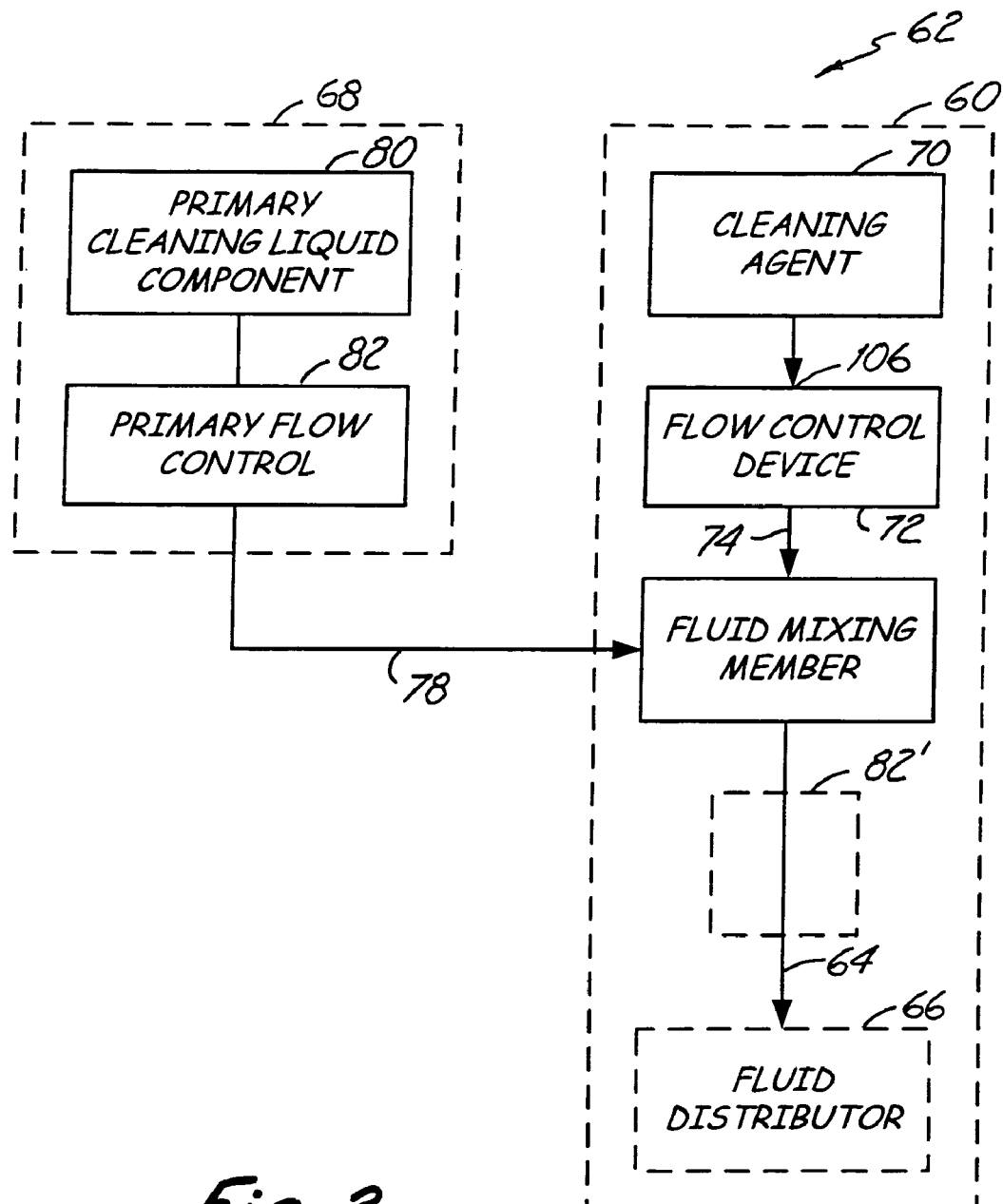
FIG. 3 is a schematic diagram illustrating a chemical dispenser of a cleaning liquid dispensing system in accordance with embodiments of the invention.

The present invention is directed to a chemical dispenser 60, shown schematically in FIG. 3, for use in a hard floor surface cleaner, such as cleaner 10, that can provide a substantially constant flow of cleaning agent. Chemical dispenser 60 can be formed as a component of a cleaning liquid dispensing system 62, which provides a substantially constant flow of cleaning liquid 64 to a fluid distributor 66, scrub head 20 (FIG. 1) adjacent the hard floor surface, or other cleaner component. The cleaning liquid generally includes a combination of a primary cleaning liquid component, dispensed by a primary cleaning liquid component dispenser 68 and the cleaning agent dispensed from chemical dispenser 60.

Chemical dispenser 60 generally includes a supply of cleaning agent 70 and a flow control device 72. Flow control device 72 is fluidically coupled to the cleaning agent 70 and includes a substantially constant output flow 74 of cleaning agent having a flow rate that is substantially independent of the volume of cleaning agent contained in the supply 70. In accordance with one embodiment, chemical dispenser 60 includes a fluid mixing member 76 that receives the output flow 74 of cleaning agent and an output flow 78 of primary cleaning liquid component from dispenser 68. Fluid mixing member 76 combines the flows of cleaning agent and primary cleaning liquid component and produces the output flow 64 of cleaning liquid.

Output flow 64 of cleaning liquid is preferably maintained at a low volume flow rate that is desired for the floor cleaning operation. This near constant low volume flow rate of output flow 64 of cleaning liquid provides significant improvements over the prior art gravity-fed fluid dispensing systems, which have a varying flow rate of cleaning liquid and must be configured to ensure that the minimum flow rate of cleaning liquid is sufficient to perform the cleaning operation. Unfortunately, this results in much higher flow rates, and, possibly, much lower flow rates than desired. Accordingly, when the desired flow rate of cleaning liquid is 0.5 GPM, prior art flow cleaners will provide flow rates that substantially exceed the desired flow rate, whereas cleaning liquid dispenser 62 of the present invention can provide a near constant flow rate of 0.5 GPM.

In accordance with embodiments of the invention, the output flow 64 of cleaning liquid is preferably limited to approximately 0.2 GPM. This leads to longer operational runtimes, shorter downtime, and faster floor cleaning operations. Furthermore, cleaning liquid expenses are reduced since less is used for a given job. Also, this reduction in cleaning liquid reduces time spent disposing liquid waste and refilling the cleaner with cleaning liquid. Other advantages, such as faster floor drying, can also be realized by hard floor surface cleaners utilizing cleaning liquid dispensing system 62 of the present invention to further improve the efficiency of floor cleaning operations.

In accordance with this embodiment, cleaning agent 70 is in a concentrated form, preferably 38% solids, such that the desired volume flow rate of flow 74 of cleaning agent is approximately 10 cubic centimeters or less per minute. In accordance with a preferred embodiment, the mixing ratio of primary cleaning liquid component to cleaning agent is approximately 1000:1. However, other mixing ratios can be used as well. As a result, the volume flow rate of cleaning agent is preferably 0.1% that of the primary cleaning liquid component. The cleaning agent preferably includes an anionic surfactant, a non-anionic surfactant, a cationic surfactant, or a combination thereof. A particularly preferred surfactant is DETERIC Cp-Na-38 manufactured by DeForest Enterprises, Inc. of Boca Raton, Fla. Alternative cleaning agents may include one or more surfactants, builders, solvents, or other components. The primary cleaning liquid component is preferably water that is stored, for example, in tank 18 shown in FIG. 1.

Primary cleaning liquid component dispenser 68 generally includes a supply of primary cleaning liquid component 80 and a primary flow control device 82. The supply of primary cleaning liquid component 80 can be contained in tank 18 (FIG. 1), for example. Primary flow control device 82 is fluidically coupled to the supply of primary cleaning liquid component 80 and produces the substantially constant output flow 78 of primary cleaning liquid component. Alternatively, as shown at 82' primary flow control device, or components thereof, can be positioned downstream of fluid mixing member 76 to control the flow of cleaning liquid 64.

Figure 4:
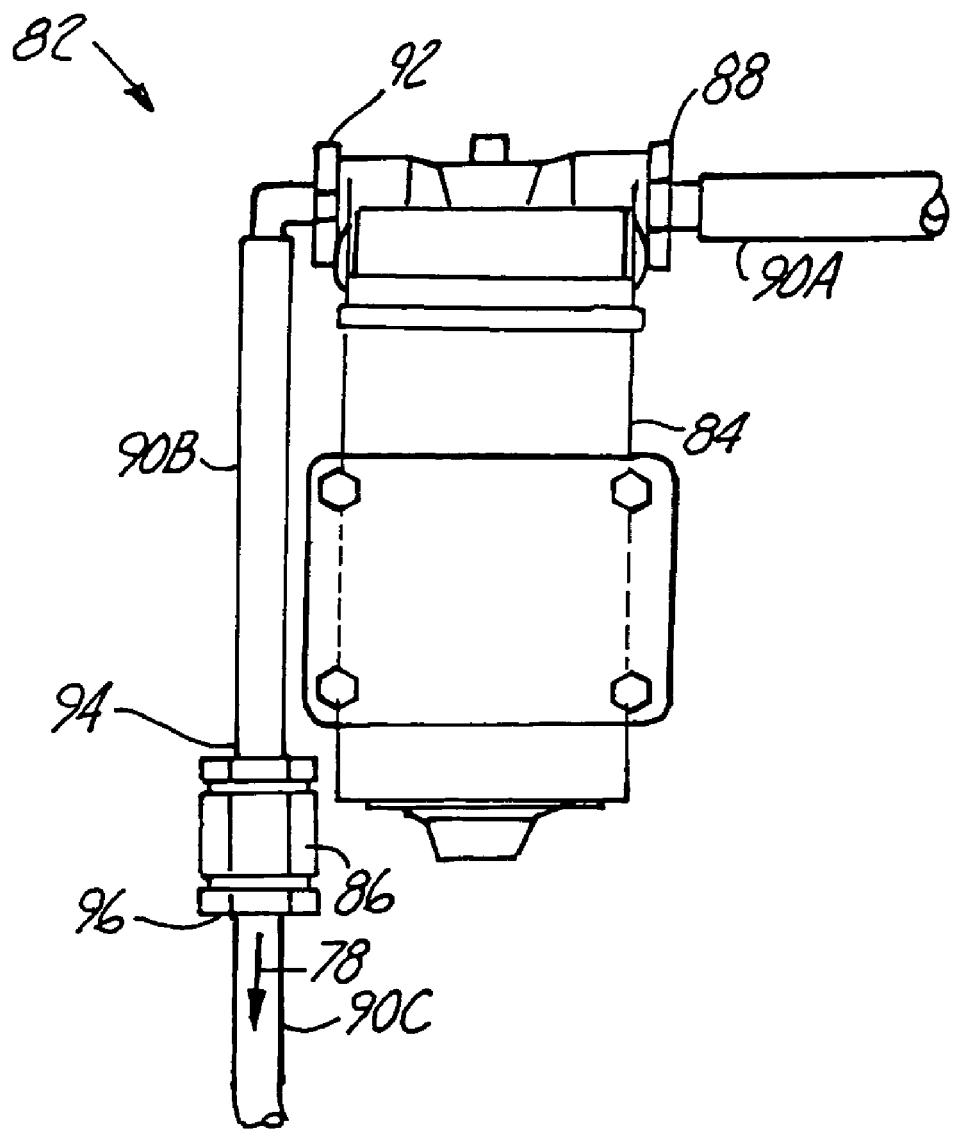
FIG. 4 is a front elevation view of a primary cleaning liquid component dispenser in accordance with an embodiment of the invention.

In accordance with one embodiment of the invention, primary flow control device 82 includes a pump 84 and a flow restriction member 86, as shown in FIG. 4. Pump 84 includes an inlet 88 that receives the supply of primary cleaning liquid component through conduit section 90A. Pump 84 also includes an outlet 92 that is maintained at a high pressure. The output flow 78 of primary cleaning liquid component (or flow 64 of cleaning liquid) is provided through outlet 92 and through conduit section 90B. In accordance with one embodiment, the pressure at outlet 92 is held substantially constant at approximately 40 pounds per square inch (psi). Pump 84 is preferably a diaphragm pump, such as diaphragm pump model number 8006-543-250 manufactured by Shur Flo of Garden Grove, Calif. Other types of pumps can also be used.

Flow restriction member 86 is generally positioned in line with conduit sections 90B and 62C and the flow of primary cleaning liquid component 78. Alternatively, flow restriction member 86 could be positioned downstream of fluid mixing member 76 (as indicated by dashed box 82' of FIG. 3) and in line with the flow of cleaning liquid 64. Flow restriction member 86 includes an upstream high pressure side 94 and a downstream low pressure side 96 as shown in FIG. 4. The pressure drop across flow restriction member 86 between high pressure side 94 and low pressure side 96 restricts the flow of fluid therethrough to provide the desired volume flow rate. Multiple flow restriction members 86 can be positioned in series to provide the desired pressure drop in the fluid flow.

Figure 5:
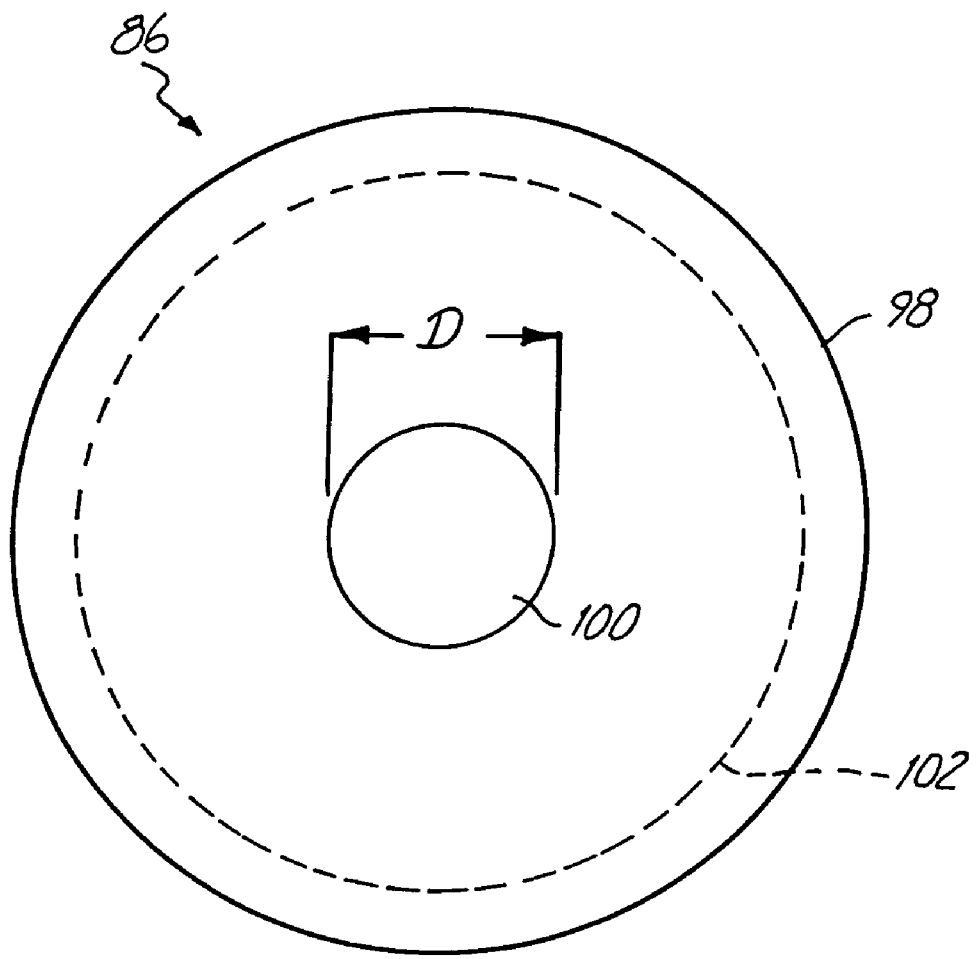
FIG. 5 is a schematic diagram of a flow restriction member in accordance with an embodiment of the invention.

In accordance with one embodiment, flow restriction member 86 is a metering orifice or orifice plate 98, shown schematically in FIG. 5. Orifice plate 98 includes an orifice 100 through which the output flow 78 of primary cleaning liquid component (or flow 64 of cleaning liquid) flows. Plate 98 is installed in conduit 62, the inner diameter of which is indicated by dashed line 102, such that the fluid is forced to flow through orifice 100. This produces the pressure drop as described above and restricts the output flow 78 or 64 to the desired flow rate. In accordance with a preferred embodiment, orifice 100 of orifice plate 98 has a diameter D of 0.03 inch to provide the desired output flow of 0.2 GPM when the pressure of outlet 92 of pump 84 is at approx. 40 psi. One example of a suitable metering orifice or orifice plate 98 is part number CP 4916-40 manufactured by Spraying Systems Co. of Wheaton, Ill. Other orifice plates or metering orifice configurations are possible as well, such as by providing multiple orifices in the plate 98 or other flow restriction configurations.

In order to maintain the desired distribution of cleaning liquid to the hard floor surface during cleaning operations, the pressure at output 92 of pump 84 can be varied depending upon the velocity of cleaner 10. Thus, at slower speeds, the pressure at outlet 92 can be reduced to lower the output flow 78 or 64 and, thus, the volume of liquid that is applied to the hard floor surface. Likewise, as the velocity of the cleaner 10 is increased, the pressure at outlet 92 can be increased to increase the fluid flow and maintain the desired wetting of the hard floor surface with cleaning liquid.

Referring now to FIGS. 3 and 6–10, a more detailed discussion of chemical dispenser 60 will be provided. As discussed above, chemical dispenser 60 generally includes supply of cleaning agent 70 and flow control device 72 shown in FIG. 3. The supply of cleaning agent 70 is preferably stored in a disposable container or cleaner cartridge and received at an inlet 106 of flow control device 72. Flow control device 72 operates to provide a substantially constant output flow 74 of cleaning agent to a fluid mixing member 76. Fluid mixing member 76 combines the flows of cleaning agent and primary cleaning liquid component and produces an output flow 64 of cleaning liquid that can be provided to fluid distributor 66, scrub head 20, or other cleaner component.

Figure 9:
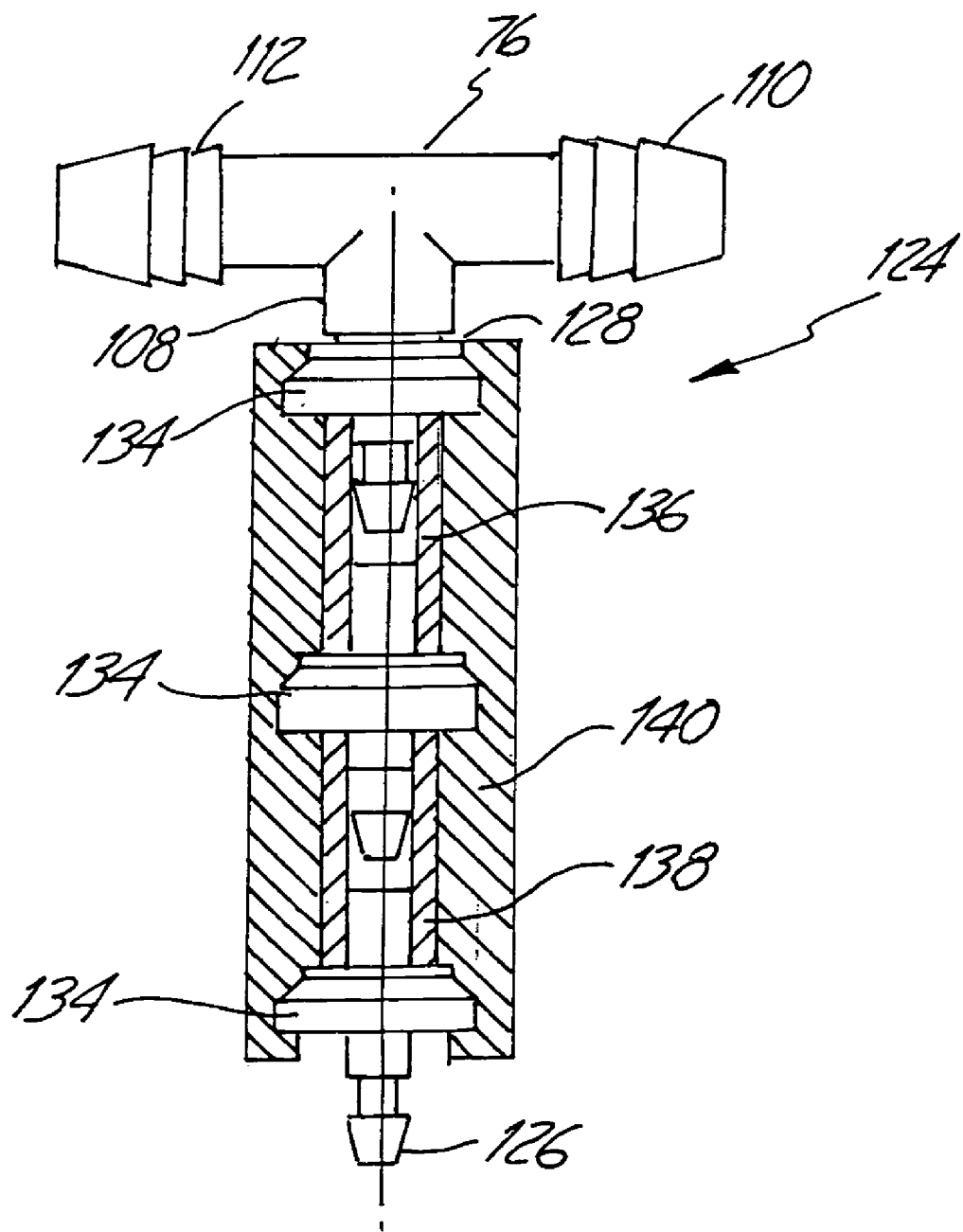
FIG. 9 is a front elevation view in partial cross-section of a flow restriction member coupled to a fluid mixing member in accordance with an embodiment of the invention.

Fluid mixing member 76, best shown in FIG. 9, is generally depicted as a T-coupling having inlets 108 and 110 that respectively receive the flows 74 and 78 of cleaning agent and primary cleaning liquid component. The flow of cleaning liquid 64 is then provided at an outlet 112. Other types of fluid mixing components can be used as well. Fluid mixing member 76 can be positioned either upstream or downstream of primary flow control device 82 or, more particularly, pump 84. It is generally preferable, however, to position fluid mixing member downstream of pump 84 due to the substantially constant pressure in the conduit at that location which results in a more constant flow 74 of cleaning agent.

Figure 6:
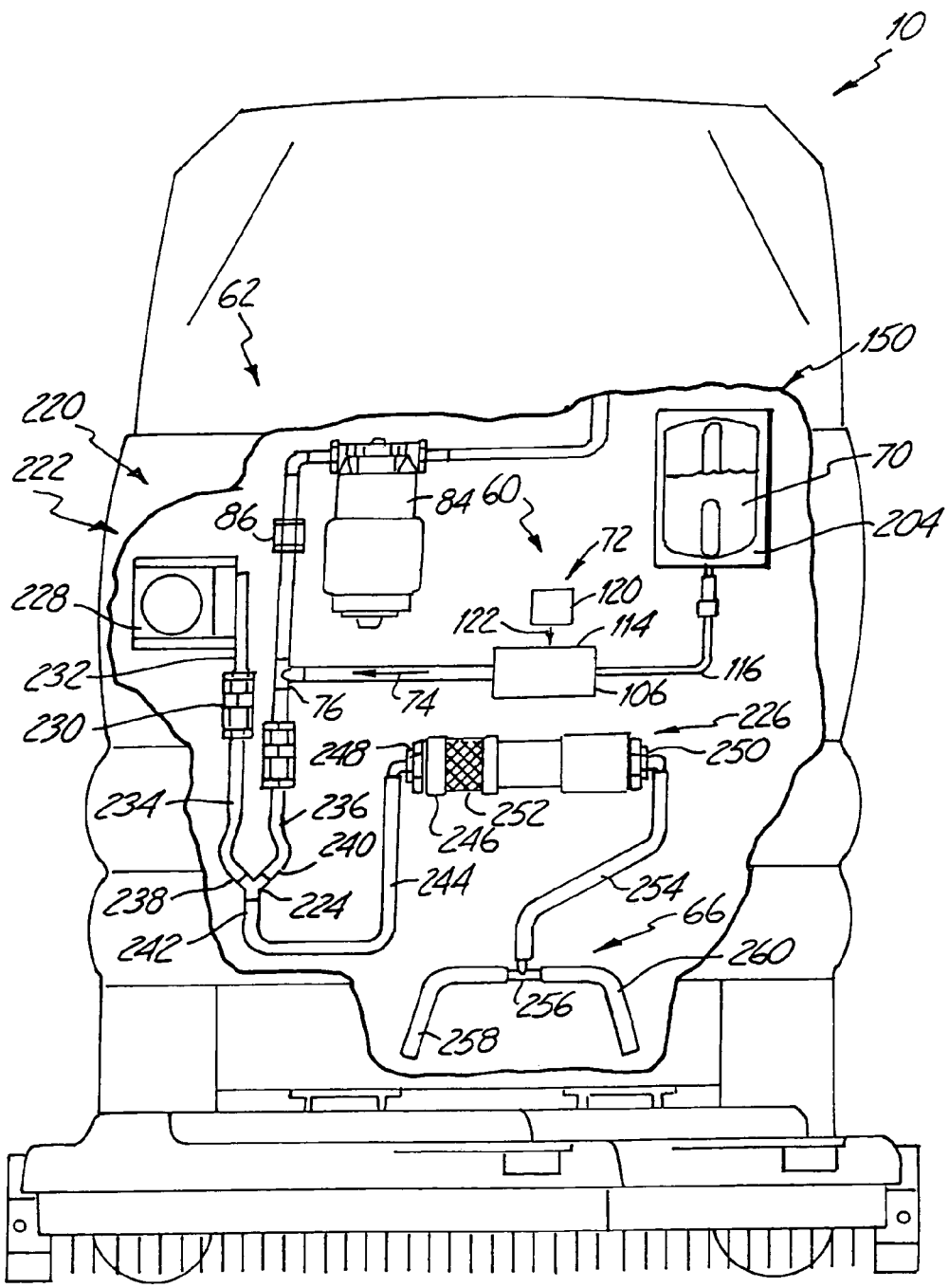
FIGS. 6–8 are front elevation views of chemical dispensers and other components of a cleaning liquid dispensing system in accordance with various embodiments of the invention.
Figure 7:
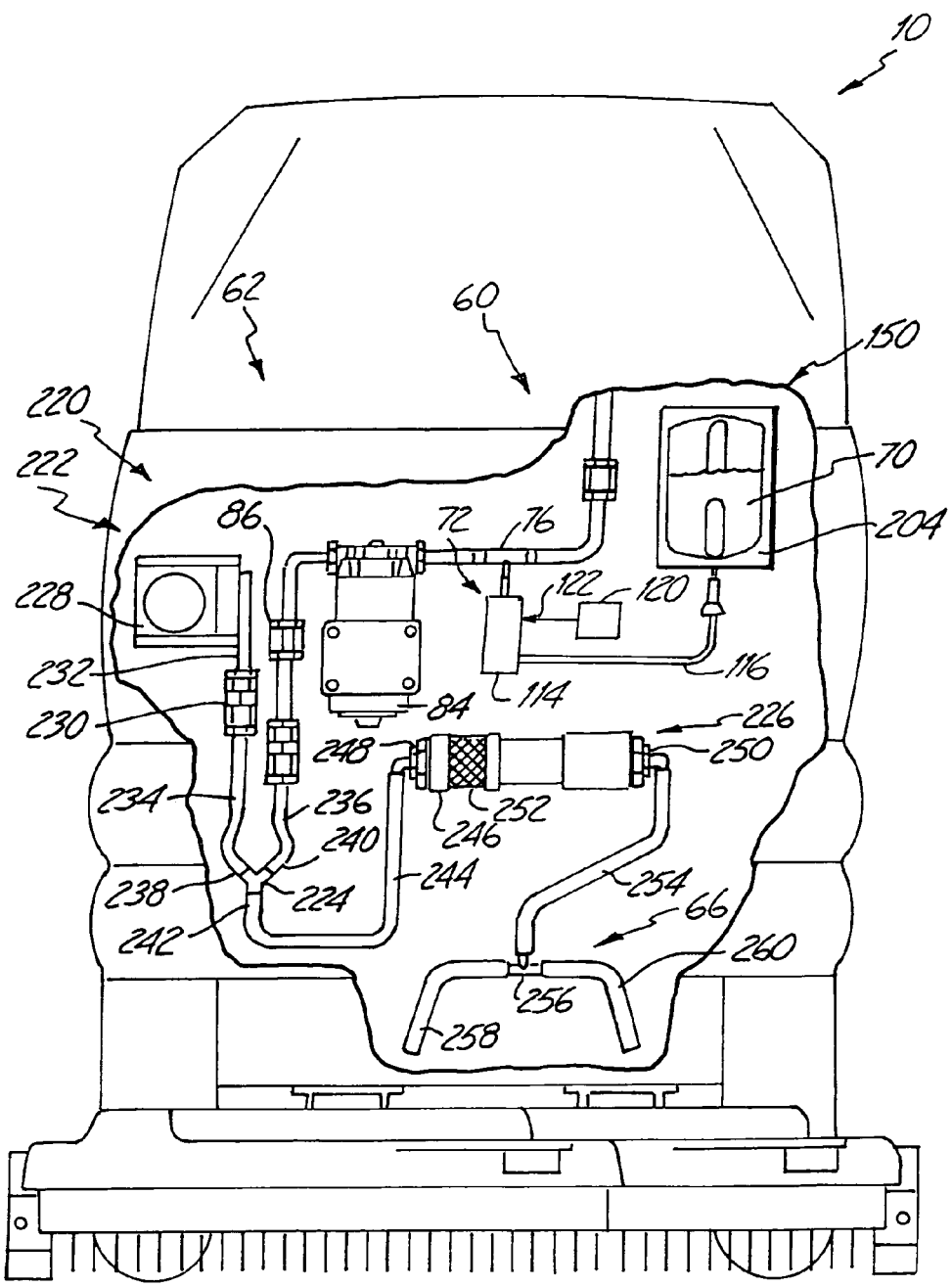

In accordance with one embodiment, flow control device 72 includes a pump 114 that receives cleaning agent from supply 70 and drives the flow 74 of cleaning agent through conduit 116 to fluid mixing member 76 located either upstream or downstream of primary flow control device 82, as shown in FIGS. 6 and 7. The flow 74 of cleaning agent is generated substantially independently of the volume of cleaning agent in supply 70. A check valve (not shown) can be installed in line with conduit section 118 to prevent the back flow of cleaning agent and primary cleaning liquid component to tank 18 when fluid mixing member 76 is in the upstream location. Pump 114 is preferably a solenoid pump, such as pump number ET200BRHP sold through Farmington Engineering of Madison, Conn. and manufactured by CEME. Another suitable pump is the SV 653 metering pump manufactured by Valcor Scientific. Other types of pumps can also be used for pump 114.

A controller 120 controls the operations of pump 114 through a control signal 122. One suitable controller is part number QRS2211C (either 24V of 36V) sold by Infitec Inc. or Syracuse, N.Y. In accordance with one embodiment, signal 122 is a pulsed signal that provides power relative to ground (not shown) and controls the duration over which the pump drives the cleaning agent through conduit 116. For example, control signal 122 can turn pump 114 on for 0.1 seconds and off for 2.75 seconds to produce the desired low volume output flow 74 of concentrated cleaning agent.

Figure 8:
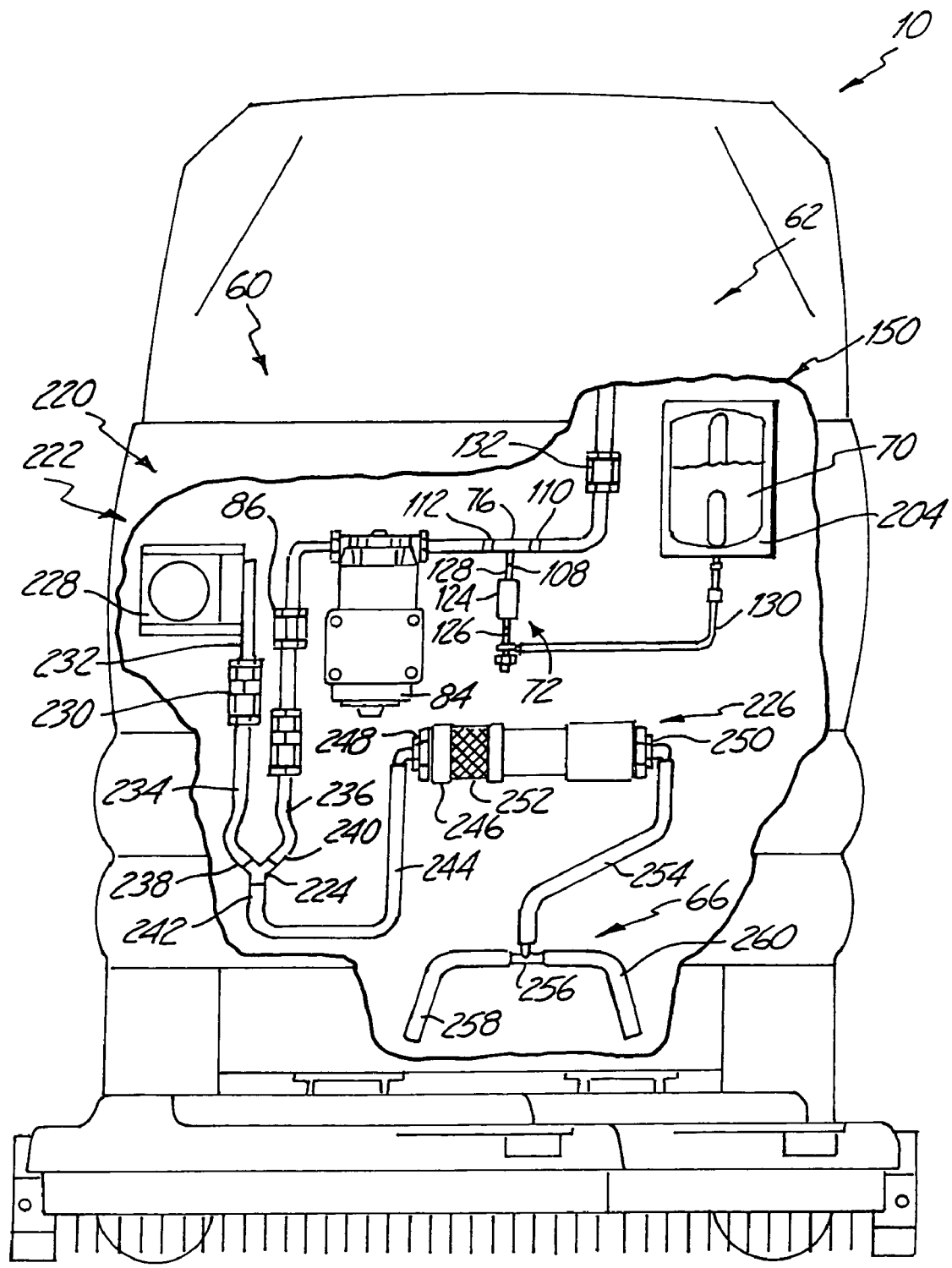

In accordance with another embodiment of the invention, flow control device 72 includes a flow restriction member 124 having an upstream high pressure inlet 126 and a low pressure outlet 128, as shown in FIG. 8. Inlet 126 of flow restriction member 124 is fluidically coupled to supply of cleaning agent 70 through conduit section 130 and outlet 128 is fluidically coupled to inlet 108 of fluid mixing member 76. Fluid mixing member 76 is positioned upstream of pump 84 and receives a flow of primary cleaning liquid component at inlet 110. A vacuum generating component 132, such as a metering orifice or orifice plate, in combination with pump 84 is provided in line with the flow of primary cleaning liquid component to produce a low pressure region, preferably at approximately −1.0 psi, adjacent outlet 128 and fluid mixing member 76. This vacuum produces a pressure gradient from the inlet 126 to outlet 128 of flow restriction member 124 that results in a substantially constant flow 74 (FIG. 3) of cleaning agent through flow restriction member 124. At the preferred low flow rate of cleaning agent, the flow 74 of cleaning agent through flow restriction member 124 remains substantially constant even as the volume of supply 70 changes.

Flow restriction member 124 can include a labyrinthine fluid flow path to provide the desired flow restriction, in accordance with one embodiment of the invention. The labyrinthine path is preferably formed by one or more drip irrigators 134, as shown in FIG. 9. One such preferred drip irrigator suitable for use in flow restriction member 124 is described in U.S. Pat. No. 5,031,837 and available as part number R108C manufactured by Raindrip of Woodland Hills, Calif. Preferably, three drip irrigators 134 are placed in series and are coupled together with tubing sections 136 and 138. A surround 140 can cover the drip irrigators 134 and tubing sections 136 and 138. Outlet 128 couples to inlet 108 of fluid mixing member 76 or a section of tubing coupled to fluid mixing member 76. Inlet 126 couples to conduit 130 (FIG. 8) for fluid communication with supply 70. Other suitable drip irrigators or similar flow restricting devices can also be used to form flow restriction member 124.

Figure 10:
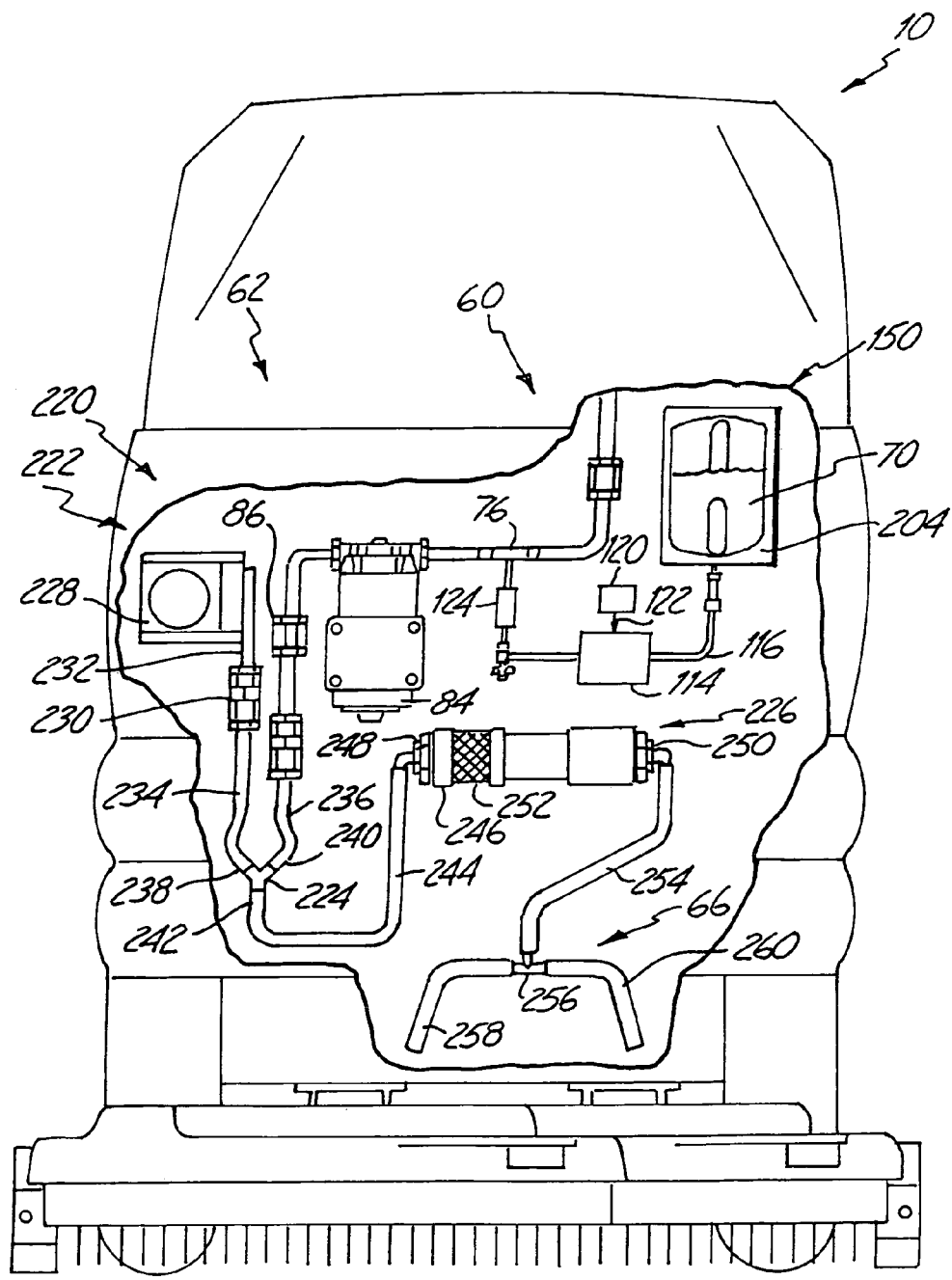
FIG. 10 is a front elevation view of a chemical dispenser of a cleaning liquid dispensing system in accordance with an embodiment of the invention.

In accordance with another embodiment of the invention, flow control device 72 includes both pump 114 and flow restriction member 124, as shown in FIG. 10. Pump 114 and flow restriction member 124 are placed in line with the supply of cleaning agent 70 and fluid mixing member 76. Pump 114 drives the cleaning agent, in response to a control signal 122 from controller 120, through flow restriction member 124. Thus, pump 114 generates the desired pressure at inlet 126 of flow restriction member that is higher than that at outlet 128 or fluid mixing member 76 to produce the pressure gradient across flow restriction member 124 and drive the flow 74 of cleaning agent therethrough at a substantially constant flow rate. In accordance with an alternative embodiment, flow restriction member 124 can be placed in line with pump 114, shown in FIG. 6, and couple to fluid mixing member 76 positioned downstream of pump 84.

Figure 11:
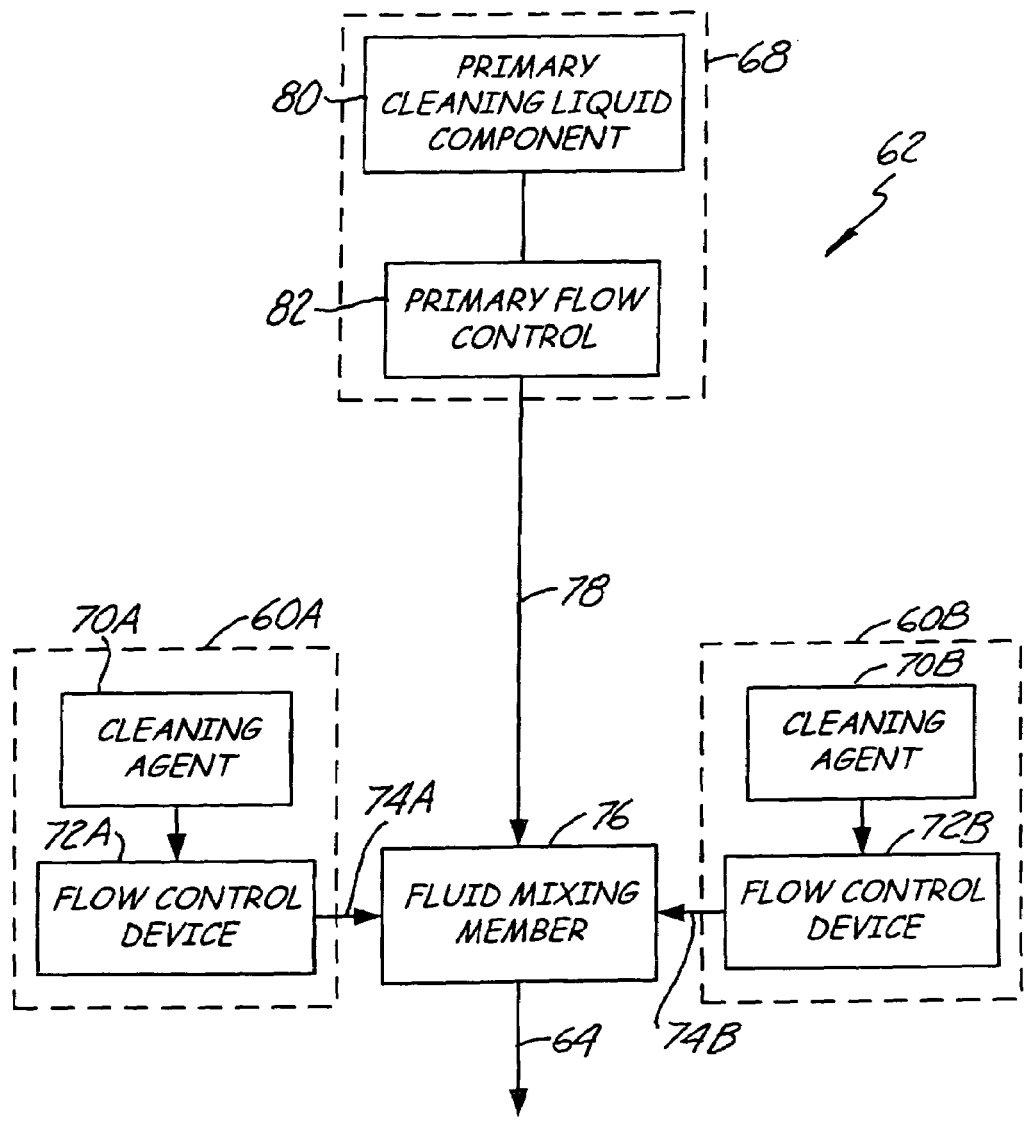
FIG. 11 is a schematic diagram of a cleaning liquid dispensing system utilizing multiple chemical dispensers in accordance with an embodiment of the invention.

Cleaning liquid dispenser 62 can also be configured to use multiple chemical dispensers 60, each of which is configured to dispense a respective cleaning agent or chemical for mixing with a flow of primary cleaning liquid component from dispenser 68. In the example shown in FIG. 11, two chemical dispensers 60A and 60B are used to respectively dispense flows 74A and 74B of cleaning agents 70A and 70B using flow control devices 72A and 72B. The flows 74A and 74B are provided to fluid mixing member 76 for mixing with flow 78 of primary cleaning liquid component from dispenser 68. Additional chemical dispensers 60 dispensing other cleaning agents or chemicals could be added. This arrangement allows cleaner 10 to dispense a different type of cleaning agent or other chemical as desired for the cleaning operation. For example, the separate supplies 70 could contain cleaning agents having different concentrations, cleaning agents that are suitable for different types of hard floor surfaces, defoaming agents, rinsing agents, waxing agents, disinfectants, solvents, alkaline builders, or other chemicals.

Fluid mixing member 76 can be configured to mix one or more of the cleaning agents with flow 78 of primary cleaning liquid component. Fluid mixing member 76 can include a single multi-way valve or other suitable component. Fluid mixing member 76 is preferably positioned to reduce the amount of cleaning liquid that must flow through cleaner 10 before a changeover to the new cleaning agent can be completed. This is particularly important when the preferred highly concentrated cleaning agents are used and the flow rates are low. However, many other configurations are possible. For instance, several of the chemical dispensers 60, shown in FIG. 3, can be used to produce separate cleaning liquid flows. The cleaning liquid flows from the multiple chemical dispensers can then be switched using an appropriate valve to provide the desired cleaning liquid to the hard floor surface through fluid distributor 66 or other cleaner component.

Figure 12:
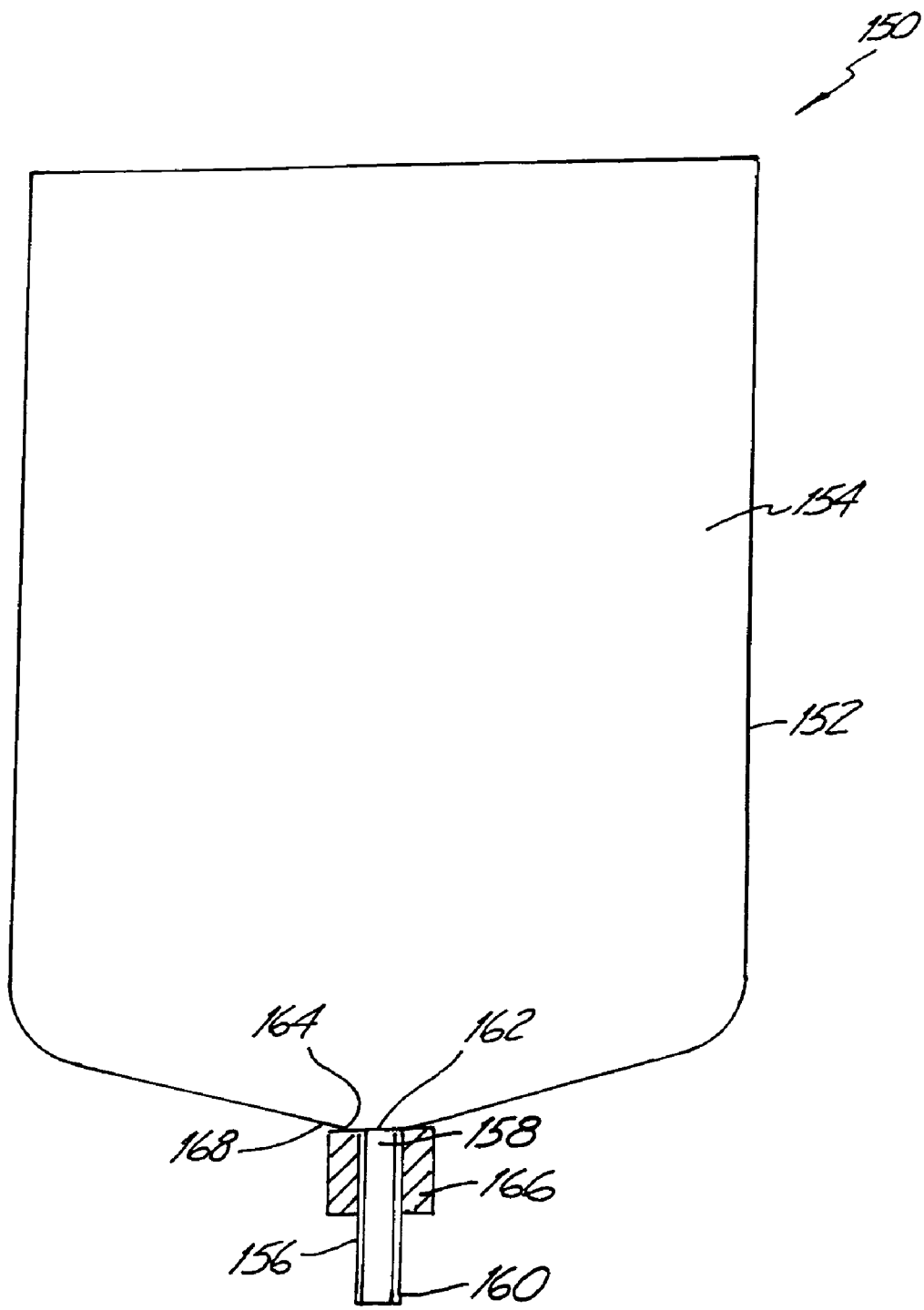
FIG. 12 is a front elevation view and partial cross-section of a cleaner cartridge in accordance with an embodiment of the invention.

Cleaning agent supply 70 is preferably contained in a disposable container or cleaner cartridge 150, as shown in FIG. 12. Cleaner cartridge 150 generally includes a container 152 having an interior cavity 154 and conduit 156. Conduit 156 includes a first end 158 that is fluidically coupled to interior cavity 154 and a second end 260 that is connectable to chemical dispenser 60. A volume of 2.8 liters, for example, of the supply of cleaning agent can preferably be contained within interior cavity 154 for dispensing to chemical dispenser 60 through conduit 156.

Container 152 is preferably a collapsible bag that is completely sealed except where connected to conduit 156. Thus, container 152 shrinks as the cleaning agent stored therein is depleted. In accordance with this embodiment, container 152 can be formed of vinyl or other suitable material. Alternatively, container 152 can take the form of a rigid container, such as a box, that includes a vent for replacing dispensed cleaning agent with air. Container 152 can be transparent or translucent to allow the cleaning agent to be viewed. Alternatively, container 152 can be formed of a material that prevents the exposure of the cleaning agent contained therein from light.

First end 158 of conduit 156 is preferably attached to container 152 such that it is flush with the inside of outlet 162. A seal 164 is formed between first end 158 and container 152 at outlet 162 to prevent cleaning agent from escaping at that junction. In accordance with one embodiment, seal 164 includes an annular neck 186 surrounding first end 158 and adjoining container 152. A weld 168 can be formed between annular neck 186 and first end 158 and container 152 to further seal the junction. Other methods for sealing the junction of first end 158 and container 152 can also be used.

Figure 13:
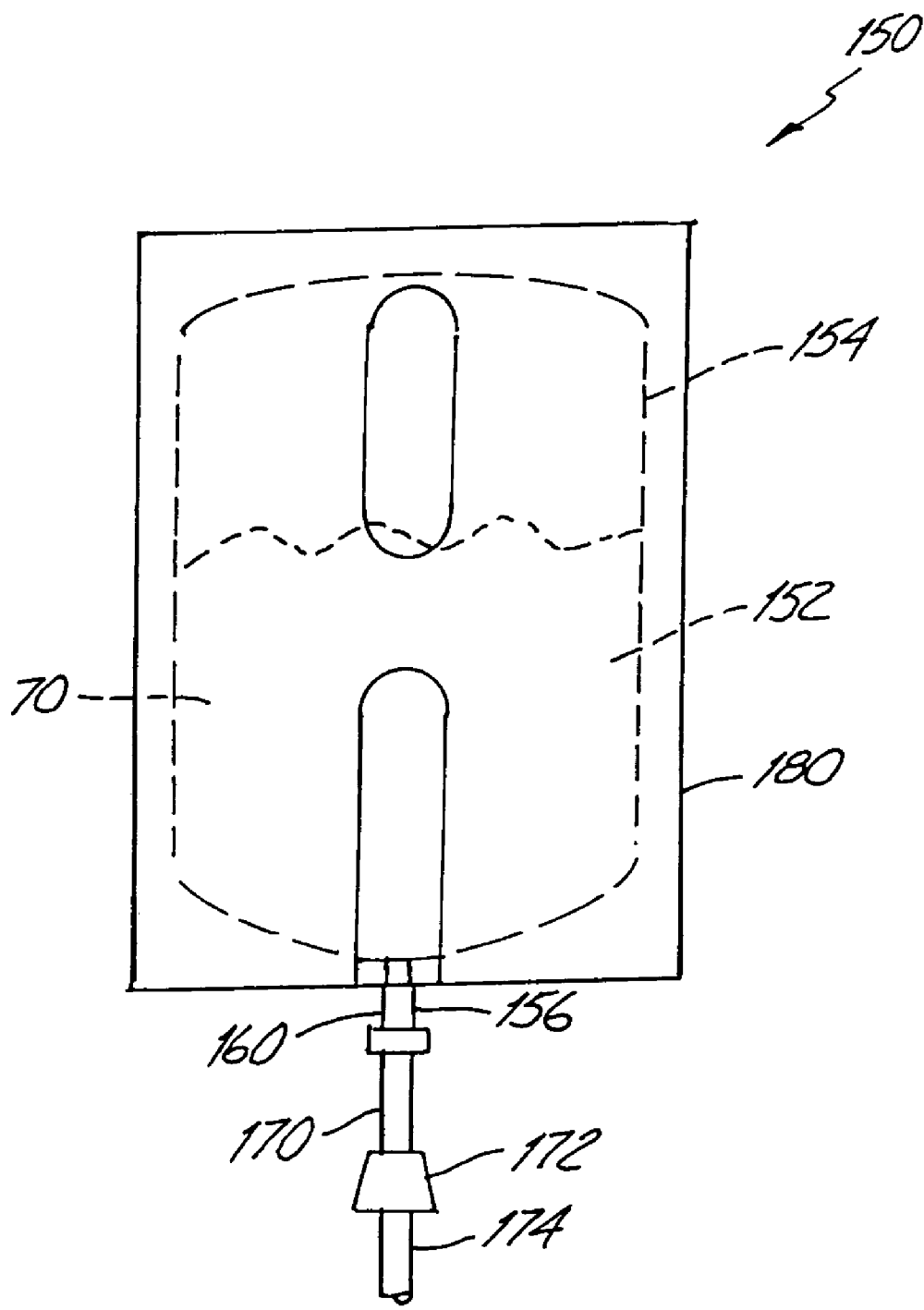
FIG. 13 is a front elevation view of a cleaner cartridge illustrating various embodiments of the invention.

Conduit 156 can also include a flow control member 170, shown in FIG. 13, mounted to second end 260 to prevent the flow of cleaning agent therethrough when disconnected from chemical dispenser 60. Flow control member 170 preferably includes a connector (quick-disconnect coupling) that includes a shut-off valve that is actuated when disconnected from chemical dispenser 60 to seal container 152 and prevent the out flow of cleaning agent therefrom. Chemical dispenser 60 preferably includes a connector 172, shown attached to a section of conduit 174, that cooperates with connector/flow control member 170 to facilitate the quick connection of cleaner cartridge 150 thereto. One suitable arrangement for connector/flow control member 170 attached to second end 260 of conduit 156 and the cooperating connector 172 are coupling insert PLCD2200612 and coupling body PLCD1700412 manufactured by Colder Products Company of St. Paul, Minn. Other types of flow control members 170 can also be installed at second end 260 of conduit 156 to seal interior cavity 154 of container 152 such as a valve, a metering device, a clamp, a membrane, or a cap.

Figure 14:
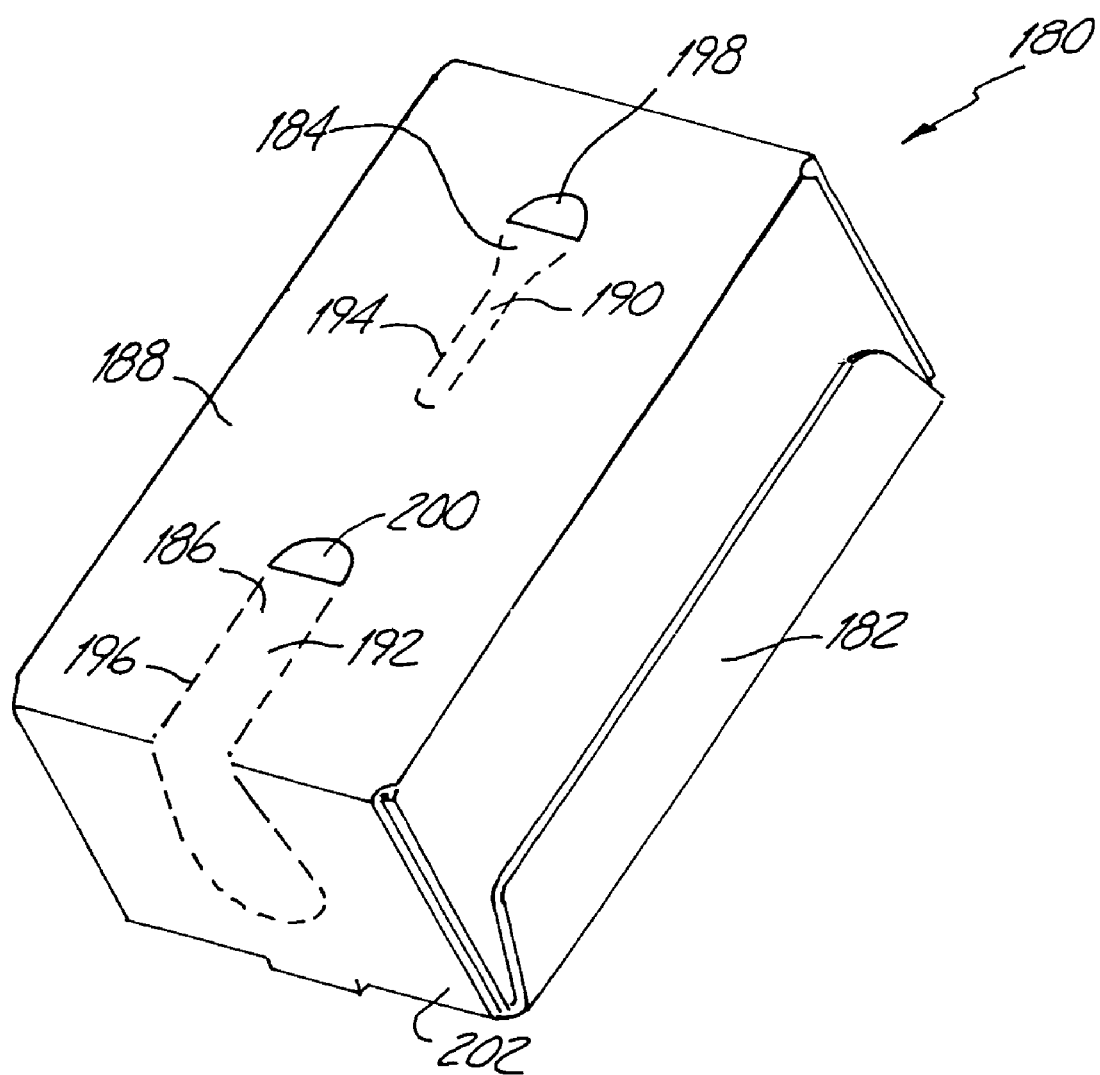
FIG. 14 is a perspective view of a housing of a cleaner cartridge in accordance with embodiments of the invention.

In accordance with one embodiment of the invention, cleaner cartridge 150 includes a housing 180, shown in FIG. 14, that can enclose container 152, conduit 156 and connector/flow control member 170. Housing 180 provides protection and support to container 152, which is particularly useful when container 152 is in the form of a collapsible bag. Housing 180 is preferably made from a single piece of rigid or semi-rigid material, such as plastic, cardboard and/or metal that is folded to form a box, which is preferably glued shut at, for example, tab 182. In accordance with a preferred embodiment, housing 180 is formed of corrugated plastic or cardboard.

Housing 180 also includes openings 184 and 186 on at least one side wall 188 that are preferably defined by removable portions 190 and 192, respectively. Portions 190 and 192 have perforated edges 194 and 196, which facilitate their easy removal to expose openings 184 and 186. Housing 180 can also include apertures 198 and 200 to provide finger access to further simplify the removal of portions 190 and 192. Opening 184 generally provides visual access to container 152 and allows a user to asses the volume of cleaning agent contained therein. Opening 186, in addition to providing visual access to container 152, also provides access to conduit 156 and connector/flow control member 170 for connection to chemical dispenser 60. In accordance with one embodiment, opening 190 and removable portion 192 can also be formed on bottom 202 through which conduit 156 can extend for efficient dispensing of the cleaning solution in container 152, as shown in FIG. 13. Other openings can also be provided in housing 180 as desired.

Figure 15:
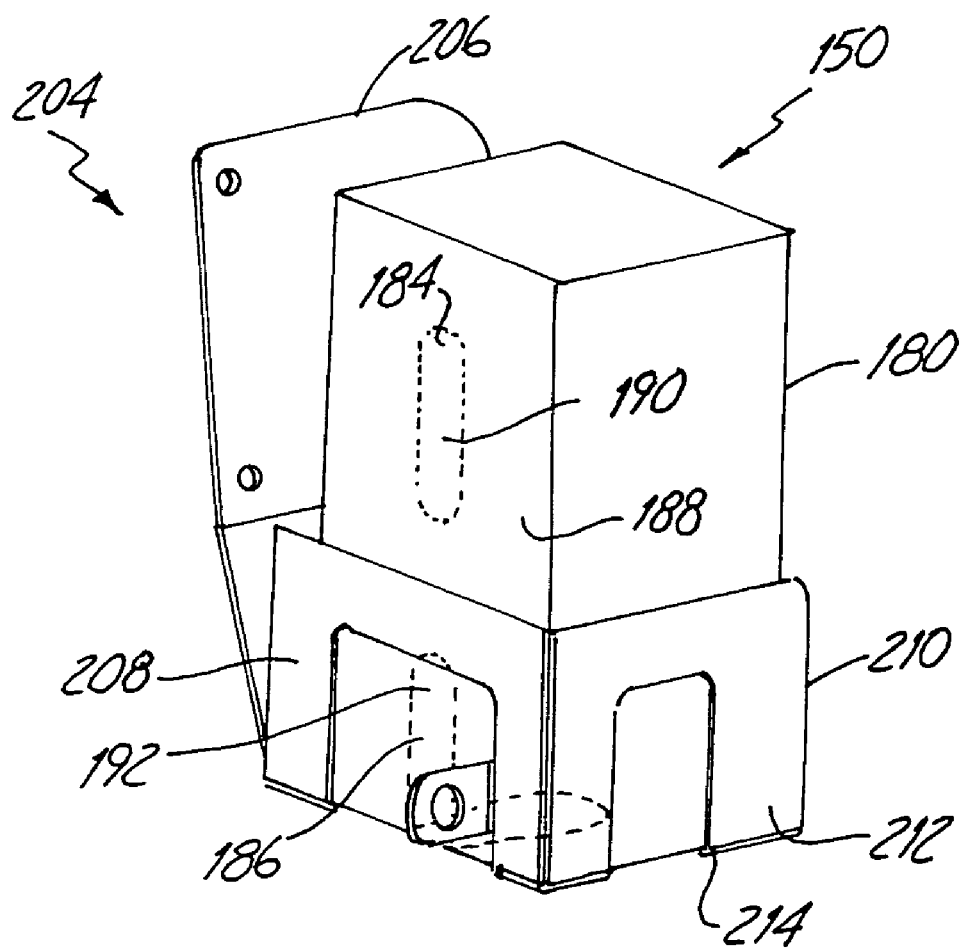
FIG. 15 is a perspective view of a cleaner cartridge installed on a cartridge receiver in accordance with an embodiment of the invention.

Cleaner cartridge 150 is preferably removably receivable in a cartridge receiver 204 of cleaner 10, shown in FIG. 15. In accordance with one embodiment, cartridge receiver 204 is a bracket having a back plate 206, opposing side walls 208 and 210, a front wall 212, and a bottom 214. Back plate 206 is mountable to a wall of cleaner 10 to position cleaner cartridge 150 proximate flow control device 72. Bottom 214 and side wall 208 include an opening through which conduit 156 can extend for connection to chemical dispenser 60. Cartridge 150 can be secured to cartridge receiver 204 using a strap or other suitable means. Due to the limited jostling that occurs during cleaning operations, such securing devices are typically unnecessary. It is understood by those skilled in the art that cartridge receiver 204 can take on many other forms to facilitate removably mounting cartridge 150 to cleaner 10, such as a hook and loop, a clamp, and other suitable means. Multiple cleaner cartridges 150 and corresponding cartridge receivers 204 can be provided proximate their corresponding chemical dispensers 60 to accommodate the multiple chemical dispenser embodiment of the invention.

In operation, cleaner cartridge 150 is provided and a supply of cleaning agent is stored in interior cavity 154 of container 152. Next, second end 260 of conduit 156 is coupled to chemical dispenser 60 and cartridge 150 is installed in cartridge receiver 204. Chemical dispenser 60 can then receive the supply of cleaning agent through conduit 156 and provide a controlled output flow 74 of cleaning agent, as discussed above. When container 152 is collapsible, container 152 collapses in response to the output flow 74 of cleaning agent.

As described in greater detail below, the cleaning liquid can be aerated to create a foam-like aerated cleaning liquid that is delivered to the hard floor surface and utilized in the scrubbing process. The foam-like aerated cleaning liquid facilitates an efficient wetting of the floor surface. The preferred surfactant mentioned above can be used without additional additives to provide the desired foaming of the cleaning liquid. In general, the cleaning operation of this embodiment of the invention involves aerating the cleaning liquid into a foam-like aerated cleaning liquid (foamed cleaning liquid), applying the foamed cleaning liquid to the hard floor surface, working the foamed cleaning liquid with the scrub head 20, and substantially de-aerating the foamed cleaning liquid prior to recovering the soiled cleaning liquid with the recovery system. In operation, de-aeration of the aerated cleaning liquid is rapidly achieved during contact with scrubbing member 22. As a result, relatively little foam is transferred into the recovery tank 12 by the recovery system.

Referring to FIGS. 6–8 and 10, a cleaning liquid aerator for generating the foamed cleaning liquid for application to the hard floor surface during a scrubbing process according to the present invention is generally indicated at 220. Aerator 220 may include a variety of foam generation devices, including but not limited to, pressurized air and/or pressurized liquid systems, agitation systems, etc. In accordance with one embodiment, aerator 220 is disposed on the housing above scrubbing head 20 and includes an air system 222 for pressurizing air that is mixed with the flow 64 of cleaning liquid from dispensing system 62 in a first fluid mixing member 224. The mixed air and cleaning liquid can then be provided to a second fluid mixing member 226 for further mixing. A fluid distributor 66 directs the foamed aerated cleaning liquid generated by the mixing members 224 and 226 to the hard floor surface or other component of cleaner 10. The volume flow rate of the foamed aerated cleaning liquid delivered through fluid distributor 66 is substantially controlled by the volume flow rate of flow 64 of cleaning liquid and, thus, the cleaning liquid dispensing system 62.

The air system 222 for generating and conveying pressurized air includes an air pump 228, a check valve 230, and associated fluid conduit sections 232 and 234. Suitable types of air pumps 228 include piston, diaphragm or rotary vane pumps. One preferred air pump 228 is a piston pump model number 22D1180-206-1002 manufactured by Gast Manufacturing, Inc., of Benton Harbor, Mich. Check valve 230 is provided for back flow prevention of cleaning liquid into the air pump 228. Check valves can also be positioned in line with dispensing system 62 to prevent the back flow of fluid therethrough. The pressure at the output of air pump 228 is greater than that at low pressure side 96 of flow restriction member 86, such as approximately 40 psi.

The first mixing element 224 receives pressurized air from the air pump 228 via conduit section 234 and pressurized cleaning solution from cleaning liquid dispensing system 62 via conduit section 236. The first mixing element 224 (Y-coupling), has a pair of inlet ports 238 and 240 and an outlet port 242 through which the mixture is discharged. First mixing element 224 may be alternatively configured, but should include at least a pair of inlet ports for pressurized air and pressurized cleaning liquid and an outlet port for discharging the mixture. First mixing element 224 may be defined as a passive mixing element. An alternative first mixing element may include active mixing devices, such as energized impeller.

The outlet port 242 of the first mixing element 224 can be coupled to an electric solenoid valve (not shown) that is in line with conduit 244 to control the flow of fluid to the second mixing element 226 and to fluid distributor 66. Said valve could be operable between an open position in which solution is permitted to flow out of the first mixing element 224 and a closed position in which solution flow is blocked. Alternative valves may be used to control the flow of fluid within the system, such as a variable output valve or other suitable component.

The second mixing element 226 receives and further mixes the pressurized air and cleaning liquid from the first mixing element 224. Second mixing element 226 can be a passive element including a relatively rigid receiver 246 having an inlet port 248 and an outlet port 250. A diffusion medium 252 is contained within the receiver 246. The diffusion medium 252 is capable of producing foam by shearing action, air entrainment or a combination of both. In a preferred embodiment, the diffusion medium 252 includes a plurality of SCOTCH-BRITE brand copper pads, manufactured by Minnesota Mining and Manufacturing Company of St. Paul, Minn. Alternative diffusion media may also be practicable, including but not limited to glass beads, foams, and other porous substrates.

The length and diameter of the receiver 246 as well as structure of the diffusion medium 252, are sized so as to maintain the operating pressure of the system 220 at a desired level. The diffusion medium 252 and receiver 246 size affect the quality of the foam generated in the second mixing element 226. More particularly, using coarser diffusion medium 252 allows for easier passage of the foam through the receiver 246 since there are fewer contact, or blocking, points between medium 252 in the receiver 246. However, the coarser diffusion medium also results in larger foam bubbles. By using a sufficiently long receiver 246 with an appropriate diffusion medium 252, large foam bubbles formed near the upstream end of the receiver 246 will break down into more desirable smaller bubbles prior to reaching the downstream end of the receiver 246. As an example, the receiver 246 of the illustrated embodiment is about 9 inches long and has an inner diameter of approximately 2 inches.

The receiver 246 may be provided at an incline relative to the ground surface so that inlet port 248 is at a slightly lower elevation than outlet port 250. By so providing the inlet port 248 above the outlet port, the amount of aerated cleaning liquid delivered to the scrub brushes 22 after the valve controlling the flow therethrough has closed, may be minimized. Various modifications and adaptations to the aerator 220 may be practicable.

The foamed cleaning liquid is discharged from the second mixing element 226 and directed toward the fluid distributor 66 via conduit section 254. Flow within conduit 254 is separated by a T-coupling 132 into conduits 258 and 160 of fluid distributor 66. The outlet of conduit sections 258 and 160 are provided above associated scrubbing member 22. During operation, the foamed cleaning liquid (or non-foamed cleaning liquid) is centrifuged out under the scrubbing member 22 in contact with the hard floor surface. Alternative approaches to aerated cleaning liquid delivery would be appreciated by those skilled in the relevant arts.

In operation, pressurized air and cleaning liquid is received into the first mixing element 224 and directed via conduit 244 through second mixing element 226. As the mixture of air and cleaning liquid flows through the diffusion medium 252 of the second mixing element 226, foam bubbles are generated. Foam output from the second mixing element 226 is discharged via conduit sections 254, 258 and 160 to the scrubbing medium 22.

Hard floor surface cleaner 10 generates a relatively wet foam as compared to carpet cleaners to provide the desired wetting of the hard floor surface. A foam's "dryness" may be defined in relation to this volumetric expansion ratio. A "dry" foam has a higher expansion ratio as compared to a "wet" foam. High-expansion foams used in presently available types of carpet cleaning machines are actually relatively "dry" as the ratio of air to water is high. Dry foams are used in carpet cleaning to facilitate quick drying of the cleaned carpet. A "wet" foam is not typically used in carpet cleaning devices as these foams can cause excessive wetting of the carpet which may lead long drying times and mold development. In a particular embodiment, the ratio of volumes between the cleaning liquid (non-aerated) and the foamed cleaning liquid is approximately 1:8. For example, 0.15 gallons of cleaning liquid is aerated to occupy 1.25 gallons. Other volume ratios would yield acceptable scrubbing results.

As the cleaning machine 10 is moved forward, the foamed cleaning liquid is dispensed by fluid distributor 66 through conduit sections 258 and 160 at the front of the chassis and the scrubbing media 22 engage the foamed cleaning liquid and hard floor surface. The foamed cleaning liquid permits an efficient wetting of the hard floor surface, even at dramatically reduced cleaning liquid flow rates (e.g. 0.2 GPM). The process of mechanically working the foam with the scrubbing medium 22 results in substantial defoaming or de-aeration (up to 95% reduction in volume) of the foamed cleaning liquid prior to soiled solution recovery. In contrast, prior art devices using known chemical detergents may create additional foam by the brush action, necessitating defoaming devices as mentioned herein.

A soiled solution of cleaning liquid and soil is developed by the interaction of the scrubbing medium 22 in contact with the foamed cleaning liquid and the hard floor surface. The soiled solution includes partially de-aerated cleaning liquid and soil released from the hard floor surface. The soiled solution is recovered from the hard floor surface by recovery system 32 and conveyed to recovery tank 12.

The recovered soiled solution may be treated to reduce foam using various defoaming techniques, including an addition of defoaming chemical to the recovery tank 12. In the embodiment described herein, the soiled solution is substantially defoamed during the scrubbing process. The above referenced particular surfactant beneficially yields a foamed cleaning solution which rapidly de-aerates after contact with the rotating scrub brushes 22. As a result, in a preferred embodiment no additional defoaming devices or chemicals are required.

The scrubber 10 may include a defoaming device or system to reduce the volume of the collected soiled solution. The defoaming device or system may be part of the soiled solution collection and handling device 32 or may be disposed in relation to the soiled solution tank 12. The defoaming device or system may include a chemical defoaming system for applying a defoaming chemical to collected foam. The defoaming device may include an acoustic and/or mechanical defoaming device.

Additional aspects of the present invention will be addressed. Regarding the foam system, alternative foam generation systems may be practicable. In the above described embodiment of aeration system 220, a compressed air and pressurized cleaning liquid process is utilized. Other means for generating the foam-like aerated cleaning liquid may be utilized. One such alternative aeration system utilizes an agitation process. The agitation process uses a mechanical device, such as a rotating impeller, to engage and entrain air within a solution. U.S. Pat. Nos. 3,761,987 and 3,931,662 each disclose an agitation-type foam generator, the disclosures of which are incorporated by reference herein.

Fluid distribution of the aerated cleaning liquid may include alternative structures. For example, the aerated or non-aerated cleaning liquid may be sprayed on the hard floor surface or scrubbing medium 22 or both. The aerated or non-aerated cleaning liquid may be delivered through the scrubbing medium 22, such as via apertures in the scrubbing medium 22, and/or applied directly to the floor surface in front of scrubbing medium 22. Distribution of aerated and non-aerated cleaning liquid may include a selective application to the hard floor surface, the brushes, or both. Alternative distribution systems may be appreciated by those skilled in the relevant art.

Although the present invention has been described with reference to preferred embodiments, workers skilled in the art will recognize that changes may be made in form and detail without departing from the spirit and scope of the invention.

What is claimed is:

1. A cleaner cartridge for use in a hard floor surface cleaner having a chemical dispenser, the cleaner cartridge comprising:
   a collapsible container having an interior cavity and configured for removable attachment to the hard floor surface cleaner;
   a supply of cleaning agent contained in the interior cavity of the container; and
   conduit having a first end coupled to the container and a second end connectable to a chemical dispenser of the hard floor surface cleaner, wherein the container is sealed except where coupled to the conduit, whereby the interior cavity is accessible through the conduit.

2. The cleaner cartridge of claim 1 including a flow control member mounted to the conduit and controlling a flow of fluid therethrough.

3. The cleaner cartridge of claim 1 including a connector attached to a second end of the conduit and configured to couple to a cooperating connector of the chemical dispenser.

4. The cleaner cartridge of claim 3, wherein the connector includes a flow control member for controlling a flow of fluid therethrough.

5. The cleaner cartridge of claim 1 including a seal between the first end of the conduit and the container.

6. The cleaner cartridge of claim 5, wherein the seal includes an annular neck adjoining the container and surrounding the first end of the conduit.

7. The cleaner cartridge of claim 6, wherein the seal includes a weld between the annular neck, the first end of the conduit, and the container.

8. The cleaner cartridge of claim 1, wherein the container is formed of a clear, opaque, or translucent material.

9. The cleaner cartridge of claim 1 including a housing enclosing the container.

10. The cleaner cartridge of claim 9, wherein the housing includes an opening through which the second end of the conduit extends.

11. The cleaner cartridge of claim 9, wherein the housing includes a side wall having an opening through which the container can be viewed.

12. The cleaner cartridge of claim 9, wherein the housing includes at least one side having a removable portion.

13. The cleaner cartridge of claim 12, wherein the removable portion defines an opening through which the conduit can extend for coupling to the dispenser.

14. The cleaner cartridge of claim 12, wherein the removable portion is defined by perforations in the wall of the housing.

15. The cleaner cartridge of claim 12, wherein the removable portion is formed in a portion of the housing selected from a group consisting of a bottom of the housing a side of the housing, and both a bottom and a side of the housing.

16. The cleaner cartridge of claim 9, wherein the housing is formed of a rigid or semi-rigid material.

17. The cleaner cartridge of claim 16, wherein the housing is formed of plastic, cardboard and/or metal.

18. The cleaner cartridge of claim 17, wherein the housing is formed of a corrugated material.

19. The cleaner cartridge of claim 1, wherein the cleaning agent includes an anionic surfactant, a nonionic surfactant, and/or a cationic surfactant.

20. The cleaner cartridge of claim 1, wherein the cleaning agent is in a concentrated form.

21. The cleaner cartridge of claim 20, wherein the cleaning agent is approximately 38% solids.

22. A hard floor surface cleaner comprising:
a motorized scrub head;
a fluid recovery device;
a cartridge receiver;
a cleaner cartridge removably received by the cartridge receiver, the cleaner cartridge including:
  a container having an interior cavity for containing a supply of cleaning agent; and
  conduit having a first end coupled to the container;
a primary cleaning liquid component dispenser configured to supply a flow of primary cleaning liquid component;
a chemical dispenser configured to supply a flow of the cleaning agent from the cleaner cartridge at a flow rate of less than 10 cubic centimeters per minute; and
a fluid mixing member configured to receive the flow of the cleaning agent and the flow of primary cleaning liquid component and to discharge a flow of cleaning liquid, which comprises a combination of the cleaning agent and the primary cleaning liquid component.

23. The hard floor surface cleaner of claim 22 including a flow control member mounted to the conduit and controlling a flow of cleaning agent therethrough.

24. The hard floor surface cleaner of claim 22 including a connector attached to a second end of the conduit and configured to couple to a cooperating connector of the chemical dispenser.

25. The hard floor surface cleaner of claim 24, wherein the connector includes a flow control member for controlling a flow of fluid therethrough.

26. The hard floor surface cleaner of claim 22 including a seal between the first end of the conduit and the container.

27. The hard floor surface cleaner of claim 26, wherein the seal includes an annular neck adjoining the container and surrounding the first end of the conduit.

28. The hard floor surface cleaner of claim 27, wherein the seal includes a weld between the annular neck, the first end of the conduit, and the container.

29. The hard floor surface cleaner of claim 22, wherein the container is formed of a clear, opaque, or translucent material.

30. The hard floor surface cleaner of claim 22, wherein the container is collapsible and the hard floor surface cleaner includes a housing enclosing the container.

31. The hard floor surface cleaner of claim 30, wherein the housing includes an opening through which the second end of the conduit extends.

32. The hard floor surface cleaner of claim 30, wherein the housing includes a side wall having an opening through which the container can be viewed.

33. The hard floor surface cleaner of claim 30, wherein the housing includes at least one side having a removable portion.

34. The hard floor surface cleaner of claim 33, wherein the removable portion defines an opening through which the conduit can extend for coupling to the dispenser.

35. The hard floor surface cleaner of claim 33, wherein the removable portion is defined by perforations in the wall of the housing.

36. The hard floor surface cleaner of claim 33, wherein the removable portion is formed in a portion of the housing selected from a group consisting of a bottom of the housing, a side of the housing, and both a bottom and a side of the housing.

37. The hard floor surface cleaner of claim 30, wherein the housing is formed of a rigid or semi-rigid material.

38. The hard floor surface cleaner of claim 37, wherein the housing is formed of plastic or cardboard.

39. The hard floor surface cleaner of claim 37, wherein the housing is formed of a corrugated material.

40. The hard floor surface cleaner of claim 22, wherein the primary cleaning liquid component dispenser includes a pump configured to drive the flow of primary cleaning liquid component.

41. The hard floor surface cleaner of claim 22 including an aerator configured to convert the flow of cleaning liquid to a foam-like aerated cleaning liquid.

42. The hard floor surface cleaner of claim 22 including a pump configured to drive the flow of the cleaning agent.

43. The hard floor surface cleaner of claim 42 including a controller having a control signal, wherein the pump is configured to drive the flow of the cleaning agent in response to the control signal.

44. The hard floor surface cleaner of claim 43, wherein the control signal includes a pulsed signal.

45. The hard floor surface cleaner of claim 43, wherein the pump is powered by the control signal.

46. The hard floor surface cleaner of claim 42, wherein the pump is a solenoid pump.

47. The hard floor surface cleaner of claim 22 including a flow restriction member in line with the flow of the cleaning agent.

48. The hard floor surface cleaner of claim 47 including a pump in line with the flow restriction member.

49. The hard floor surface cleaner of claim 47, wherein the flow restriction member includes a labyrinthine fluid flow path through which the flow of the cleaning agent travels.

50. The hard floor surface cleaner of claim 47 including a vacuum generating component downstream of the flow restriction member relative to the flow of the cleaning agent.

51. The hard floor surface cleaner of claim 50, wherein the vacuum generating component includes an orifice plate inline with the flow of primary cleaning liquid component.

52. The hard floor surface cleaner of claim 22, wherein the container includes a vent.

53. The hard floor surface cleaner of claim 52, wherein the container is rigid.

54. A cleaner cartridge for use in a hard floor surface cleaner having a chemical dispenser, the cleaner cartridge comprising:
  a collapsible container having an interior cavity and configured for removable attachment to the hard floor surface cleaner;
  a housing enclosing the container and including a side wall having an opening through which the container can be viewed; and
  conduit having a first end coupled to the container and a second end connectable to a chemical dispenser of the hard floor surface cleaner, wherein the collapsible container is sealed except where coupled to the conduit, and fluid contained in the interior chamber is accessible through the conduit.

55. The cleaner cartridge of claim 54, including a flow control member mounted to the conduit and controlling a flow of fluid therethrough.

56. The cleaner cartridge of claim 54 including a connector attached to a second end of the conduit and configured to couple to a cooperating connector of the chemical dispenser.

57. The cleaner cartridge of claim 56, wherein the connector includes a flow control member for controlling a flow of fluid therethrough.

* * * * *

UNITED STATES PATENT AND TRADEMARK OFFICE
CERTIFICATE OF CORRECTION

PATENT NO. : 7,051,399 B2 Page 1 of 1
APPLICATION NO. : 10/152549
DATED : May 30, 2006
INVENTOR(S) : Bruce F. Field et al.

It is certified that error appears in the above-identified patent and that said Letters Patent is hereby corrected as shown below:

Col. 14, line 37, change "the" to --a--.

Col. 14, line 52, add a comma (--,--) after the word "housing".

Signed and Sealed this

Sixth Day of February, 2007

JON W. DUDAS
*Director of the United States Patent and Trademark Office*